US012356316B2

(12) United States Patent
Kang et al.

(10) Patent No.: US 12,356,316 B2
(45) Date of Patent: Jul. 8, 2025

(54) METHOD AND APPARATUS FOR SUPPORTING SYSTEM INFORMATION ACQUISITION BY SIDELINK REMOTE TERMINAL OVER SIDELINK RELAY

(71) Applicant: Samsung Electronics Co., Ltd., Suwon-si (KR)

(72) Inventors: Hyunjeong Kang, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 275 days.

(21) Appl. No.: 17/738,723

(22) Filed: May 6, 2022

(65) Prior Publication Data

US 2022/0361091 A1 Nov. 10, 2022

(30) Foreign Application Priority Data

May 7, 2021 (KR) .......................... 10-2021-0059483
Apr. 22, 2022 (KR) .......................... 10-2022-0050325

(51) Int. Cl.
  *H04W 48/14* (2009.01)
  *H04W 88/04* (2009.01)
  *H04W 92/18* (2009.01)

(52) U.S. Cl.
  CPC ............ *H04W 48/14* (2013.01); *H04W 88/04* (2013.01); *H04W 92/18* (2013.01)

(58) Field of Classification Search
  CPC ...... H04W 48/14; H04W 88/04; H04W 92/18
  See application file for complete search history.

(56) References Cited

U.S. PATENT DOCUMENTS

| 2016/0337954 | A1  | 11/2016 | Gulati et al. |
| 2017/0034745 | A1* | 2/2017  | Dhanapal ............... H04W 36/34 |
| 2018/0270868 | A1* | 9/2018  | Ou ....................... H04W 74/004 |
| 2018/0302754 | A1  | 10/2018 | Kim et al. |
| 2019/0223094 | A1  | 7/2019  | Ingale et al. |
| 2019/0380159 | A1  | 12/2019 | Bangolae et al. |
| 2020/0236692 | A1* | 7/2020  | Lin ...................... H04W 72/535 |
| 2021/0092670 | A1* | 3/2021  | Fujishiro ............... H04W 48/16 |
| 2021/0120476 | A1* | 4/2021  | Lee ........................ H04W 48/10 |
| 2021/0337554 | A1* | 10/2021 | Wang .................... H04W 24/10 |
| 2021/0392651 | A1* | 12/2021 | Futaki ................... H04L 5/0098 |
| 2022/0132414 | A1* | 4/2022  | Ingale ................... H04W 72/23 |

(Continued)

FOREIGN PATENT DOCUMENTS

| KR | 10-2019-0022489 A | 3/2019 |
| WO | 2017/155291 A2 | 9/2017 |
| WO | 2018/064477 A1 | 4/2018 |

OTHER PUBLICATIONS

International Search Report dated Aug. 12, 2022, in International Application No. PCT/KR2022/006502.

(Continued)

*Primary Examiner* — Ajay Cattungal

(74) *Attorney, Agent, or Firm* — Jefferson IP Law, LLP

(57) ABSTRACT

The disclosure relates to a 5G or 6G communication system for supporting a higher data transmission rate. A method and apparatus for a sidelink remote user equipment (UE) to request and acquire a system information message from a base station through a sidelink relay UE in a wireless communication system are provided.

18 Claims, 12 Drawing Sheets

(56) References Cited

U.S. PATENT DOCUMENTS

| | | | | |
|---|---|---|---|---|
| 2022/0141756 A1* | 5/2022 | Pan | ............... | H04W 48/12 |
| | | | | 370/328 |
| 2022/0182939 A1* | 6/2022 | Xu | ............... | H04L 5/0053 |
| 2022/0210863 A1* | 6/2022 | Wang | ............... | H04W 76/28 |
| 2022/0400434 A1* | 12/2022 | Seo | ............... | H04B 7/061 |
| 2024/0155470 A1* | 5/2024 | Orsino | ............... | H04W 48/10 |

OTHER PUBLICATIONS

3rd Generation Partnership Project; Technical Specification Group Radio Access Network; NR; Radio Resource Control (RRC) protocol specification (Release 16), 3GPP TS 38.331, vol. RAN WG2, No. V16.4.0, Mar. 30, 2021.
European Search Report dated Jan. 20, 2025, issued in European Application No. 22799160.1.

* cited by examiner

METHOD AND APPARATUS FOR SUPPORTING SYSTEM INFORMATION ACQUISITION BY SIDELINK REMOTE TERMINAL OVER SIDELINK RELAY

CROSS-REFERENCE TO RELATED APPLICATION(S)

This application is based on and claims priority under 35 U.S.C. § 119(a) of a Korean patent application number 10-2021-0059483, filed on May 7, 2021, in the Korean Intellectual Property Office, and of a Korean patent application number 10-2022-0050325, filed on Apr. 22, 2022, in the Korean Intellectual Property Office, the disclosure of each of which is incorporated by reference herein in its entirety.

BACKGROUND

1. Field

The disclosure relates to a wireless communication system. More particularly, the disclosure relates to a method and an apparatus for enabling a terminal which maintains a mode of connection with a base station, based on a sidelink in a wireless communication system, to acquire a system information message from the base station through a relay terminal capable of supporting terminal-to-terminal direct communication.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/ service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

In addition, there has been research regarding direct communication between terminals using a 5G communication system, for example, sidelink communication, and direct communication between terminals is expected to be applied to vehicle-to-everything (V2X) or a public safety network, for example, thereby providing users with various services.

The above information is presented as background information only to assist with an understanding of the disclosure. No determination has been made, and no assertion is made, as to whether any of the above might be applicable as prior art with regard to the disclosure.

SUMMARY

In connection with direct communication between terminals using sidelink communication, there is a need for a scheme for utilizing a sidelink relay capable of supporting service coverage expansion, data transmission reliability improvement, and terminal power consumption reduction.

Aspects of the disclosure are to address at least the above-mentioned problems and/or disadvantages and to provide at least the advantages described below. Accordingly, an aspect of the disclosure is to provide a method and an apparatus for enabling a sidelink remote terminal to acquire a system information message from a base station through direct communication with a sidelink relay terminal while maintaining a radio resource control (RRC)-connected mode with a base station, in order to support a terminal configured to perform sidelink-based data transmission/reception in a wireless communication system.

The technical subjects pursued in the disclosure may not be limited to the above-mentioned technical subjects, and other technical subjects which are not mentioned may be clearly understood, through the following descriptions, by those skilled in the art to which the disclosure pertains.

Technical problems to be solved by embodiments of the disclosure are not limited to the above-mentioned technical problems, and other technical problems not mentioned herein will be clearly understood from the following description by those skilled in the art to which the disclosure pertains.

Additional aspects will be set forth in part in the description which follows and, in part, will be apparent from the description, or may be learned by practice of the presented embodiments.

In accordance with an aspect of the disclosure, a method for acquiring a system information message from a base station through a sidelink relay terminal by a terminal in a RRC-connected mode (that is, RRC-connected state) with a base station in a wireless communication system is provided. The method includes when a system information message is deemed necessary, and when a configuration has been made to request a system information message, transmitting a message for requesting a necessary system information message to the base station through the sidelink relay terminal, receiving a system information message from the base station through the sidelink relay terminal, and using a system information request message procedure in a connected mode with the base station as a signaling procedure for requesting a system information message from the base station.

In accordance with another aspect of the disclosure, a method for acquiring a system information message from a base station through a sidelink relay terminal by a terminal in a RRC-connected mode with a base station in a wireless communication system is provided. The method includes acquiring a system information message forwarded by a directly connected sidelink relay terminal.

In accordance with another aspect of the disclosure, a method for acquiring a system information message from a base station through a sidelink relay terminal by a terminal in a RRC-connected mode with a base station in a wireless communication system is provided. The method includes when a system information message is deemed necessary, and when a configuration has been made to request a system information message, transmitting a message for requesting a necessary system information message to the sidelink relay terminal, receiving a system information message from the base station through the sidelink relay terminal, and using a system information request message procedure in a RRC idle mode (that is, RRC idle state) or RRC inactive mode (that is, RRC inactive state) with the base station as a procedure for requesting a system information message from the sidelink relay terminal.

In accordance with another aspect of the disclosure, a method of a sidelink relay terminal for processing system information message acquisition of a terminal in a RRC-connected mode (that is, RRC-connected state) with a base station in a wireless communication system is provided. The method includes receiving a message for requesting a system information message from a terminal directly connected through a sidelink and transferring the message to the base station, receiving a system information message transmitted by the base station and transferring the system information message to the terminal, when a configuration has been made to segment the system information message transferred from the base station, segmenting the system information message and transferring the system information message to the terminal, and when a configuration has been made to reconfigure the system information message transferred from the base station for the terminal, reconfiguring the system information message and transferring the system information message to the terminal.

In accordance with another aspect of the disclosure, a method of a sidelink relay terminal for processing system information message acquisition of a terminal in a RRC-connected mode (that is, RRC-connected state) with a base station in a wireless communication system is provided. The method includes receiving a system information message from the base station and transferring the system information message to the terminal, when a configuration has been made to segment the system information message transferred from the base station, segmenting the system information message and transferring the system information message to the terminal, and when a configuration has been made to reconfigure the system information message transferred from the base station for the terminal, reconfiguring the system information message and transferring the system information message to the terminal.

In accordance with another aspect of the disclosure, a method of a base station for processing system information message acquisition of a terminal in a RRC-connected mode (that is, RRC-connected state) with the base station in a wireless communication system is provided. The method includes acquiring a message for requesting a system information message from a terminal directly connected to a sidelink relay terminal through the sidelink relay terminal, configuring a system information message to be transmitted to the terminal and transmitting the system information message through the sidelink relay terminal, and using a system information request message procedure in the RRC-connected mode (that is, RRC-connected state) of the terminal as a signaling procedure for requesting a system information of the terminal.

In accordance with another aspect of the disclosure, a method of a base station for processing system information message acquisition of a terminal in a RRC-connected mode (that is, RRC-connected state) with the base station in a wireless communication system is provided. The method includes configuring a system information message to be transmitted to a terminal connected to a sidelink relay terminal and transmitting the system information message to the terminal through the sidelink relay terminal.

In accordance with another aspect of the disclosure, a method of a base station for processing system information message acquisition of a terminal in a RRC-connected mode (that is, RRC-connected state) with the base station in a wireless communication system is provided. The method includes acquiring a message for requesting a system information message of a sidelink remote terminal from a sidelink relay terminal, configuring a system information message to be transmitted to the terminal and transmitting the system information message to the sidelink relay terminal, and using a system information request message procedure in a RRC idle mode (that is, RRC idle state) or RRC inactive mode (that is, RRC inactive state) of the terminal as a procedure for requesting a system information message of the terminal.

In accordance with another aspect of the disclosure, an operation method is provided. The operation method, when a base station transmits a system information message to a terminal in a RRC-connected mode through a sidelink relay terminal, includes when a configuration has been made to segment a system information message, segmenting the system information message and transferring the system information message to a sidelink remote terminal through the sidelink relay terminal, or segmenting the system information message and transferring the system information message to the sidelink relay terminal (the segmented system information message is transferred to the sidelink remote terminal by the sidelink relay terminal).

In accordance with another aspect of the disclosure, an operation method is provided. The operation method, when a base station transmits a system information message to a terminal in a RRC-connected mode through a sidelink relay terminal, includes when a configuration has been made to reconfigure a system information message for the terminal, reconfiguring the system information message and transferring the system information message to a sidelink remote terminal through the sidelink relay terminal, or reconfiguring the system information message and transferring the system information message to the sidelink relay terminal (the reconfigured system information message is transferred to the sidelink remote terminal by the sidelink relay terminal).

According to an embodiment of the disclosure, a service may be effectively provided to a user in a wireless communication system, and the service coverage may be expanded.

According to an embodiment of the disclosure, battery consumption of a user terminal in a wireless communication system may be reduced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1A:
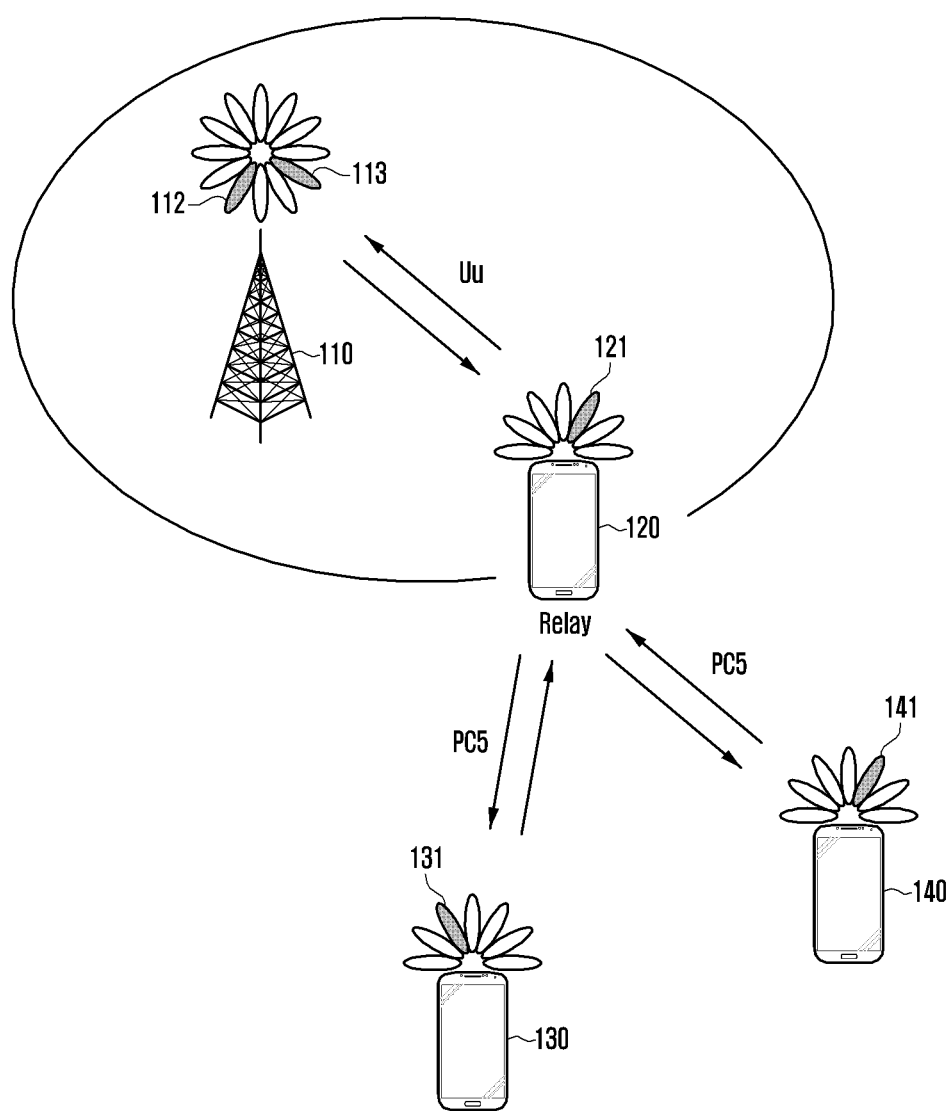
FIG. 1A is a diagram illustrating a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments in the specification, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

In various embodiments, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

The following detailed description of embodiments of the disclosure may be mainly directed to new RAN (NR) as a radio access network and packet core as a core network (5G system, 5G core network, or new generation core (NG core)) which are specified in the 5G mobile communication standards defined by the 3GPP that is a mobile communication standardization group. However, based on determinations by those skilled in the art, the main idea of the disclosure may be applied to other communication systems having similar backgrounds or channel types through some modifications without significantly departing from the scope of the disclosure.

In the 5G system, a network data collection and analysis function (NWDAF), which is a network function that provides a function to analyze and provide data collected in the 5G network, may be defined to support network automation. The NWDAF may collect/store/analyze information from the 5G network to provide results to unspecified network functions (NFs), and the analysis results may be used independently by each NF.

In the following description, some of terms and names defined in the 3rd generation partnership project long term evolution (3GPP LTE) standards (standards for 5G, NR, LTE, or similar systems) may be used for the convenience of description. However, the disclosure is not limited by these terms and names, and may be applied in the same way to systems that conform other standards.

Hereinafter, the disclosure relates to a method and an apparatus for acquiring a system information message transmitted from a base station through a sidelink relay user equipment (UE) by a terminal in an RRC connection mode with the base station in the case of directly transmitting and receiving data between terminals using the sidelink relay UEs, or in the case of transmitting and receiving data between the terminal and the base station in a wireless communication system.

Specifically, the disclosure provides a method in which a sidelink remote UE having a direct connection with a sidelink relay UE maintains an RRC connection mode with a base station and acquires a system information message transmitted from the base station through a sidelink relay UE. The method may be applied when the sidelink remote UE acquires at least one of master information block (MIB), system information block (SIB)1, other SIBs (SIB2, SIB3, . . . ), positioning system information messages (posSIBs), or a combination of system information messages in an RRC connection mode.

According to embodiments of the disclosure, service coverage may be extended by allowing the terminal to search for a sidelink relay, reliability of data transmission and reception may be increased, and battery use of the terminal may be reduced.

In the following description, terms referring to signals, terms referring to channels, terms referring to control information, terms referring to network entities, terms referring to device elements, and the like are illustratively used for the sake of convenience. Therefore, the disclosure is not limited by the terms as used below, and other terms referring to subjects having equivalent technical meanings may be used.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. However, they are merely examples thereof, and the base station and the terminal are not limited to these examples. In the disclosure, the term "eNB" may be interchangeably used with the term "gNB". That is, a base station described as "eNB" may indicate "gNB". In the disclosure, the term "terminal" may refer to various wireless communication devices including mobile phones, NB-IoT devices, and sensors.

In the following description, the terms "physical channel" and "signal" may be interchangeably used with the term "data" or "control signal". For example, the term "physical downlink shared channel (PDSCH) refers to a physical channel over which data is transmitted, but may also be used to refer to the data. That is, in the disclosure, the expression "transmitting a physical channel" may be construed as having the same meaning as the expression "transmitting data or a signal over a physical channel".

Hereinafter, in the disclosure, upper signaling refers to a method of transmitting a signal from a base station to a terminal by using a downlink data channel of a physical layer or from the terminal to a base station by using an uplink data channel of a physical layer. The upper signaling may be understood as radio resource control (RRC) signaling or a media access control element (CE).

In addition, in the disclosure, the expression of more than or less than is used to determine whether a specific condition is satisfied or fulfilled, but this is only a description for expressing an example and does not exclude more or less. The condition described as "not less than" may be replaced with "more than", the condition described as "not more than" may be replaced with "less than", and the condition described as "not less than and less than" may be replaced with "more than" and not more than".

In addition, although the disclosure describes embodiments by using terms used in some communication standards (e.g., 3rd generation partnership project (3GPP)), this is only an example for description. Embodiments of the disclosure may be easily modified and applied to other communication systems.

FIG. 1A is a diagram illustrating a wireless communication system according to an embodiment of the disclosure.

FIG. 1A illustrates a base station 110, terminals 130 and 140, and a sidelink relay 120 capable of relaying data transmission and reception between the base station and the terminal as part of nodes using a wireless channel in a wireless communication system. Here, the sidelink relay corresponds to a UE to network (U2N) relay. FIG. 1A illustrates only one base station, but another base station that is the same as or similar to the base station 110 may further exist.

The base station 110 is a network infrastructure that provides wireless access to the terminals 130 and 140 and the relay 120. The base station 110 has a coverage defined as a predetermined geographical area based on a distance at which signals may be transmitted. In addition to base station, the base station 110 may refer to "access point (AP)", "eNodeB (eNB)", "5th generation node (5G node)", "next generation node, gNB (gNodeB)", "wireless point", "transmission/reception point (TRP)", or other terms having an equivalent technical meaning.

The relay 120 is a device used by a user or a network infrastructure, and may communicate with the base station 110 through a wireless channel. A link from the base station 110 to the relay 120 may be referred to as a downlink (DL), and a link from the relay 120 to the base station 110 may be referred to as an uplink (UL). The base station 110 and the relay 120 may be connected through a Uu interface. The uplink (UL) refers to a wireless link in which the relay 120 transmits data or a control signal to the base station 110, and the downlink (DL) refers to a wireless link in which the base station 110 transmits data or a control signal to the relay 120.

The relay 120 may communicate with the first terminal 130 and the second terminal 140 through a wireless channel. In this case, the link between the relay 120 and the first terminal 130 and the link between the relay 120 and the second terminal 140 may be referred to as a sidelink, and the sidelink may be referred to as a PC5 interface.

Each of the terminals 130 and 140 is a device used by a user, and may perform communication with the base station 110 through a wireless channel or may perform communication with the relay 120 through a wireless channel. In the disclosure, a case in which each of the first terminal 130 and the second terminal 140 performs communication through a wireless channel with the relay 120 may be considered. At least one of the first terminal 130 and the second terminal 140 may be operated without the user's involvement. That is, at least one of the first terminal 130 and the second terminal 140 is a device that performs machine type communication (MTC), and may not be carried by the user. In addition to terminal, each of the first terminal 130 and the second terminal 140 may be referred to as "user equipment (UE)", "mobile station", "subscriber station", "remote terminal", "wireless terminal", "user device", "sidelink remote terminal", or other terms having an equivalent technical meaning.

Figure 1B:
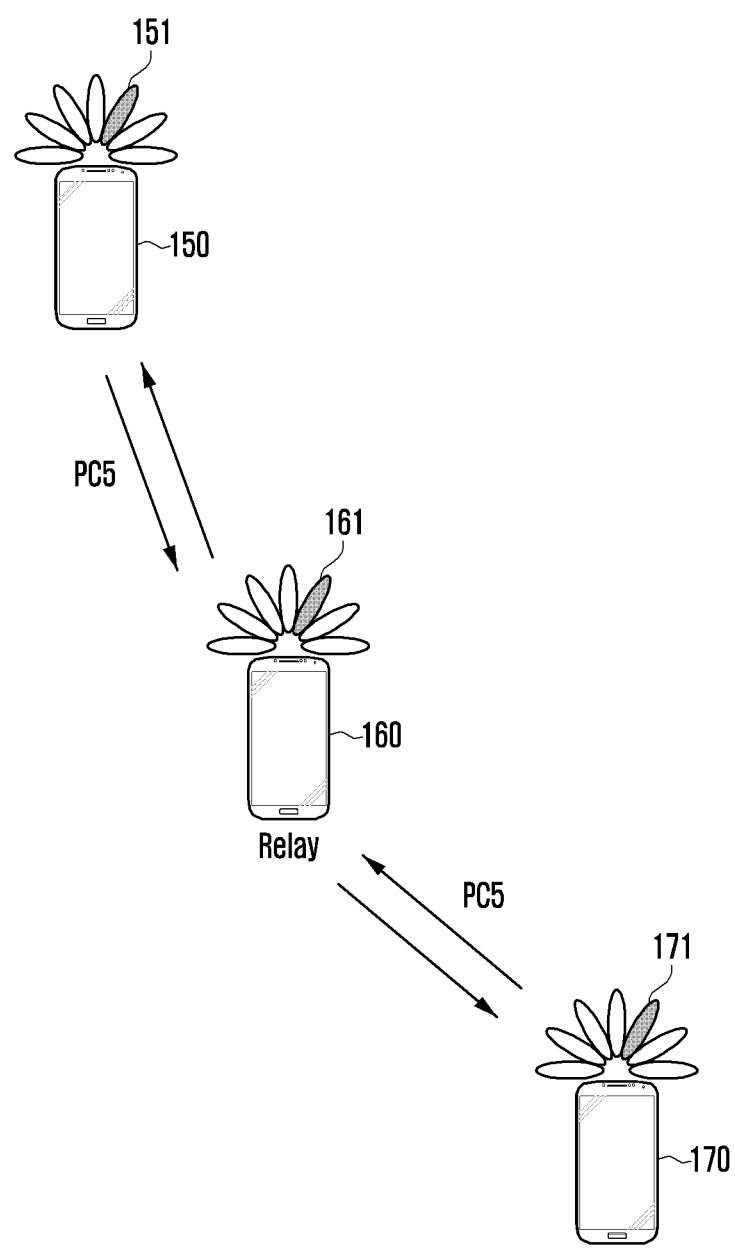
FIG. 1B is a diagram illustrating a wireless communication system according to an embodiment of the disclosure.

FIG. 1B is a diagram illustrating a wireless communication system according to an embodiment of the disclosure.

FIG. 1B illustrates terminals 150 and 170, and a sidelink relay 160 capable of relaying data transmission and reception between the terminals as part of nodes using a wireless channel in a wireless communication system. Here, the sidelink relay 160 corresponds to a UE to UE (U2U) relay.

The relay 160 may communicate with the third terminal 150 and the fourth terminal 170 through a wireless channel. In this case, the link between the relay 160 and the third terminal 150 and the link between the relay 160 and the fourth terminal 170 may be referred to as a sidelink, and the sidelink may be referred to as a PC5 interface.

Each of the third terminal 150 and the fourth terminal 170 is a device used by a user, and may perform direct communication through a wireless channel or may perform communication with a counterpart terminal through the relay 160 and the wireless channel. In this case, the link between the third terminal 150 and the fourth terminal 170, the link between the third terminal 150 and the relay 160, and the link between the fourth terminal 170 and the relay 160 are referred to as sidelinks, and the sidelink may be referred to as a PC5 interface.

At least one of the third terminal 150 and the fourth terminal 170 may be operated without the user's involvement. That is, at least one of the third terminal 150 and the fourth terminal 170 is a device that performs machine type communication (MTC), and may not be carried by the user. In addition to terminal, each of the third terminal 150 and the fourth terminal 170 may be referred to as "user equipment (UE)", "mobile station", "subscriber station", "remote terminal", "wireless terminal", "sidelink remote terminal", "user device", or other terms having an equivalent technical meaning.

In the following description, uplink or downlink and Uu interface, sidelink and PC5 may be used interchangeably.

The base station 110, the relays 120, 160, and the terminals 130, 140, 150, and 170 illustrated in FIGS. 1A and 1B may transmit and receive wireless signals in a millimeter wave band (mmWave) (e.g., 28 GHz, 30 GHz, 38 GHz, and 60 GHz). In this case, in order to improve the channel gain, the base station 110, the relays 120, 160, and the terminals 130, 140, 150, and 170 may perform beamforming. Here, the beamforming may include transmission beamforming and reception beamforming. That is, the base station 110, the relays 120, 160, and the terminals 130, 140, 150, and 170 may assign directivity to a transmission signal or a reception signal. To this end, the base station 110, the relays 120 and 160, and the terminals 130, 140, 150, and 170 may select serving beams 112, 113, 121, 131, 141, 151, 161, and 171 through a beam search or beam management procedure. After the serving beams 112, 113, 121, 131, 141, 151, 161, and 171 are selected, the communication may be performed through a resource having a quasi co-located (QCL) relationship with the resource transmitting the serving beams 112, 113, 121, 131, 141, 151, 161, and 171.

If the large-scale characteristics of the channel carrying the symbol on the first antenna port may be inferred from the channel carrying the symbol on the second antenna port, the first antenna port and the second antenna port may be evaluated as having a QCL relationship. For example, the large-scale characteristics may include at least one of a delay spread, a Doppler spread, a Doppler shift, an average gain, an average delay, and a spatial receive parameter.

The first terminal 130, the second terminal 140, the third terminal 150, and the fourth terminal 170 illustrated in FIGS. 1A and 1B may support vehicle communication. In the case of vehicle communication, standardization of vehicle to everything (V2X) technology based on device-to-device (D2D) structures was completed in 3GPP Release 14 and Release 15, and standardization of V2X technology based on 5G NR was completed in 3GPP Release 16. In NR V2X, unicast communication between terminals, groupcast (or multicast) communication, and broadcast communication may be supported. In addition, NR V2X aims to provide more advanced services such as group driving (platooning), advanced driving, extended sensor, remote driving, etc., unlike LTE V2X, which aims to transmit and receive basic safety information necessary for vehicle road driving. V2X services may be divided into basic safety services and advanced services. The basic safety services may include cooperative awareness messages (CAM) or basic safety message (BSM) services, and detailed services such as a left turn notification service, a front-vehicle collision warning service, an emergency vehicle approach notification service, a front obstacle warning service, an intersection signal information service, etc. In addition, in the basic safety service, V2X information may be transmitted and received by using the broadcast or unicast or groupcast transmission method. In advanced services, a quality of service (QoS) requirement may be strengthened compared to basic safety services. In advanced services, a method that may transmit and receive V2X information using unicast and groupcast transmission methods in addition to broadcasting to transmit and receive V2X information within a specific vehicle group or V2X information between two vehicles may be required. The advanced service may include detailed services such as a platooning service, an autonomous driving service, a remote driving service, and an extended sensor-based V2X service. In addition, NR V2X may provide a public safety service by supporting a direct communication service between terminals in areas without network infrastructure.

Hereinafter, the sidelink (SL) refers to a transmission/reception path for a signal between a terminal and a terminal or a transmission/reception path for a signal between a terminal and a relay, which may be used interchangeably with the PC5 interface. Hereinafter, the base station may be a base station supporting both V2X communication and general cellular communication, or a base station supporting only V2X communication, as a subject performing resource allocation of the terminal and the relay. That is, the base station may refer to an NR base station (e.g., gNB), an LTE base station (e.g., eNB), or a road site unit (RSU). In addition to general user equipment and mobile station, the terminal may include all of a vehicle that supports vehicle-to-vehicle communication (V2V), a vehicle or pedestrian handset (e.g., a smartphone) that supports vehicle-to-pedestrian (V2P), a vehicle that supports vehicle-to-network (V2N) or a vehicle and terminal function that supports vehicle-to-traffic infrastructure (V2I), an RSU equipped with a base station function, or an RSU equipped with a part of the base station function and a part of the terminal function.

On the other hand, in the disclosure, the terminal may refer to the vehicle that supports vehicle-to-vehicle communication (V2V), the vehicle or pedestrian handset (e.g., a smartphone) that supports vehicle-to-pedestrian (V2P), the vehicle that supports vehicle-to-network (V2N), or the vehicle that supports vehicle-to-traffic infrastructure (V2I). The terminal may refer to a user device that supports communication between devices of the public safety network.

In addition, in the disclosure, the terminal may refer to a road side unit (RSU) equipped with a terminal function, an RSU equipped with a base station function, or an RSU equipped with a part of the base station function and a part of the terminal function.

In the disclosure, the relay may refer to a vehicle supporting V2X communication or a user device supporting communication between devices of a public safety network. In addition, in the disclosure, the relay may refer to a device equipped with a terminal function, a device equipped with a base station function, or a device equipped with a part of the terminal function and a part of the base station function.

Figure 2:
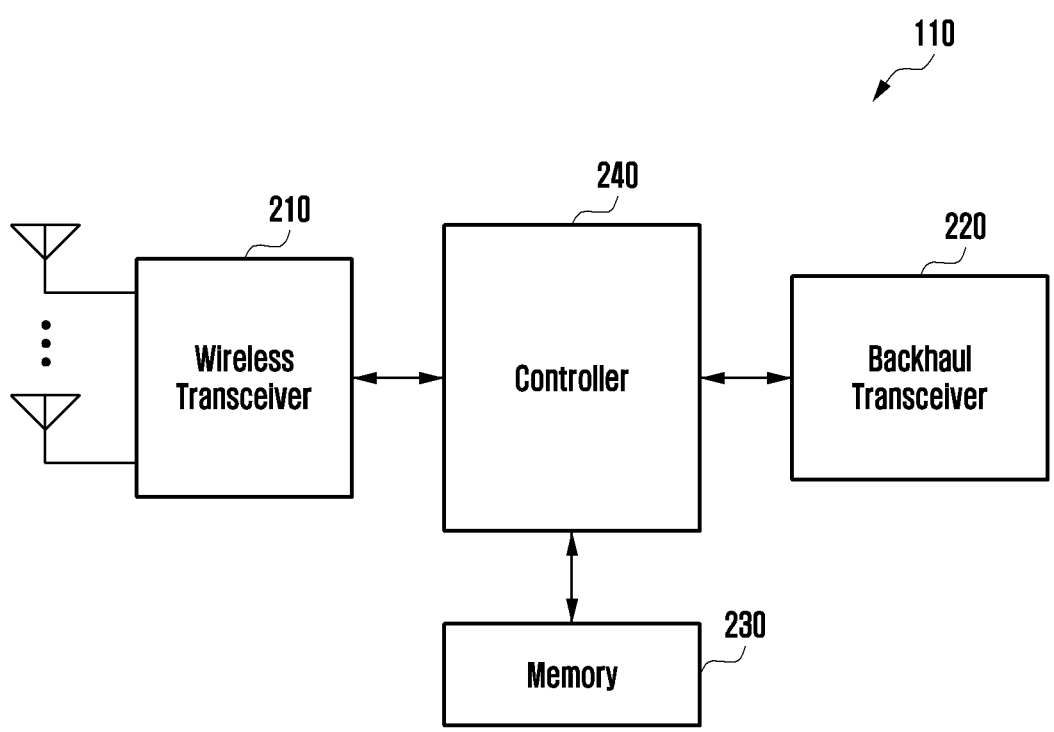
FIG. 2 is a block diagram illustrating a configuration of a base station in a wireless communication system according to an embodiment of the disclosure.

FIG. 2 is a block diagram illustrating a configuration of a base station in a wireless communication system according to an embodiment of the disclosure.

The configuration illustrated in FIG. 2 may be understood as a configuration of the base station 110. Terms such as " . . . unit", " . . . device", etc. used below refers to a unit that processes at least one function or operation, and may be implemented by hardware, software, or a combination of hardware and software.

Referring to FIG. 2, the base station 110 may include a wireless transceiver 210, a backhaul transceiver 220, a storage 230, and a controller 240. However, the components of the base station 110 are not limited to the above-described example. For example, the base station may include more or less components than the above-described components. In addition, the wireless transceiver 210, the backhaul transceiver 220, the storage 230, and the controller 240 may be implemented in the form of single chip. In addition, the controller 240 may include one or more processors.

The wireless transceiver 210 may perform functions for transmitting and receiving signals through a wireless channel. For example, the wireless transceiver 210 may perform a conversion function between a baseband signal and a bit string according to a physical layer standard of a system. For example, when transmitting data, the wireless transceiver 210 may generate complex symbols by encoding and modulating a transmission bit string. In addition, when receiving data, the wireless transceiver 210 may restore the received bit string through demodulation and decoding of the baseband signal.

In addition, the wireless transceiver 210 up-converts the baseband signal into a radio frequency (RF) band signal and transmits the RF band signal through an antenna, and down-converts the RF band signal received through the antenna into a baseband signal. To this end, the wireless transceiver 210 may include a transmission filter, a reception filter, an amplifier, a mixer, an oscillator, a digital to analog convertor (DAC), an analog to digital convertor (ADC), and the like. In addition, the wireless transceiver 210 may include a plurality of transmission/reception paths. Furthermore, the wireless transceiver 210 may include at least one antenna array composed of a plurality of antenna elements.

In terms of hardware, the wireless transceiver 210 may be composed of a digital unit and an analog unit, and the analog unit may be composed of a plurality of sub-units according to operating power, operating frequency, and the like. The digital unit may be implemented as at least one processor (e.g., a digital signal processor (DSP)).

The wireless transceiver 210 transmits and receives signals as described above. Accordingly, all or part of the wireless transceiver 210 may be referred to as a "transmitter", "receiver", or "transceiver". In addition, in the following description, transmission and reception performed through a wireless channel are used as a meaning including performing the above-described processing by the wireless transceiver 210.

The backhaul transceiver 220 may provide an interface for performing communication with other nodes in the network. That is, the backhaul transceiver 220 may convert a bit string transmitted from a base station to another node, for example, another access node, another base station, an upper node, and a core network, and converts a physical signal received from another node into a bit string.

The storage 230 may store data such as a basic program, an application program, and configuration information on the operation of the base station. The storage 230 may be configured as a volatile memory, a nonvolatile memory, or a combination of a volatile memory and a nonvolatile memory. In addition, the storage 230 may provide stored data according to a request by the controller 240.

The controller 240 may control overall operations of the base station 110. For example, the controller 240 may transmit and receive signals through the wireless transceiver 210 or the backhaul transceiver 220. In addition, the controller 240 writes and reads data in the storage 230. In addition, the controller 240 may perform functions of a protocol stack required by the communication standard. According to another embodiment, the protocol stack may be included in the wireless transceiver 210. To this end, the controller 240 may include at least one processor. According to embodiments, the controller 240 may control the base station 110 to perform operations according to embodiments to be described later.

Figure 3:
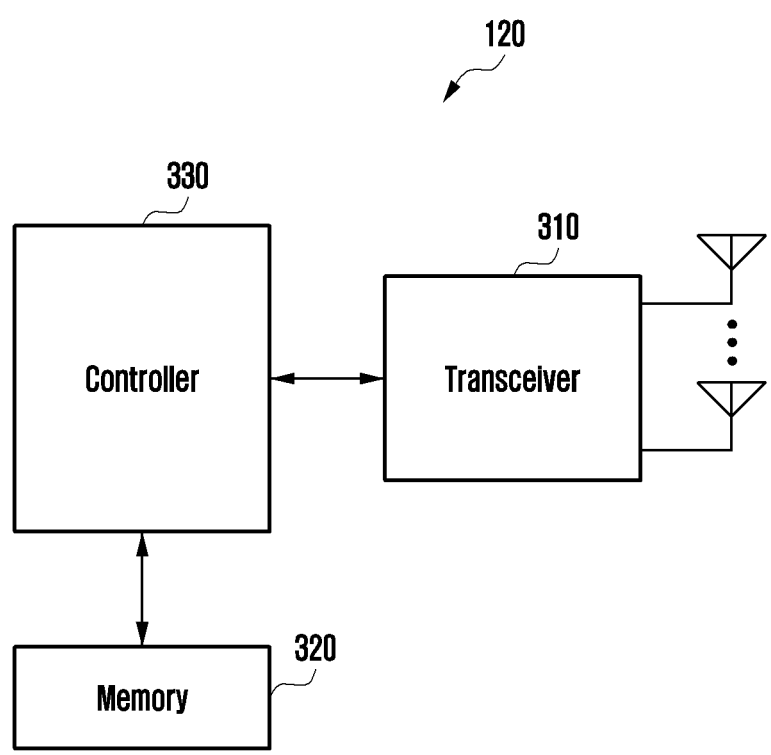
FIG. 3 is a block diagram illustrating a configuration of a terminal in a wireless communication system according to an embodiment of the disclosure.

FIG. 3 is a block diagram illustrating a configuration of a relay or a terminal in a wireless communication system according to an embodiment of the disclosure.

The configuration illustrated in FIG. 3 may be understood as a configuration of the terminal 120. Terms such as " . . . unit", " . . . device", etc. used below refers to a unit that processes at least one function or operation, and may be implemented by hardware, software, or a combination of hardware and software.

Referring to FIG. 3, the terminal 120 may include a transceiver 310, a storage 320, and a controller 330. However, the components of the terminal 120 are not limited to the above-described example. For example, the terminal 120 may include more or less components than the above-described components. In addition, the transceiver 310, the storage 320, and the controller 330 may be implemented in the form of single chip. In addition, the controller 330 may include one or more processors.

The transceiver 310 performs functions for transmitting and receiving signals through a wireless channel. For example, the transceiver 310 may perform a conversion function between a baseband signal and a bit string according to a physical layer standard of a system. For example, when transmitting data, the transceiver 310 generates complex symbols by encoding and modulating a transmission bit string. In addition, when receiving data, the transceiver 310 may restore the received bit string through demodulation and decoding of the baseband signal. In addition, the transceiver 310 may up-convert the baseband signal into an RF band signal and transmits the RF band signal through an antenna, and down-convert the RF band signal received through the antenna into a baseband signal. For example, the transceiver 310 may include a transmission filter, a reception filter, an amplifier, a mixer, an oscillator, a DAC, an ADC, and the like.

In addition, the transceiver 310 may include a plurality of transmission/reception paths. Furthermore, the transceiver 310 may include at least one antenna array composed of a plurality of antenna elements. In terms of hardware, the transceiver 310 may be composed of a digital circuit and an analog circuit (e.g., radio frequency integrated circuit (RFIC)). Here, the digital circuit and the analog circuit may be implemented as a single package. In addition, the transceiver 310 may include a plurality of RF chains. Furthermore, the transceiver 310 may perform beamforming.

The transceiver 310 may transmit and receive signals as described above. Accordingly, all or part of the transceiver 310 may be referred to as a "transmitter", "receiver", or "transceiver". In addition, in the following description, transmission and reception performed through a wireless channel may be used as a meaning including performing the above-described processing by the transceiver 310.

The storage 320 may store data such as a basic program, an application program, and configuration information on the operation of the terminal. The storage 320 may be configured as a volatile memory, a nonvolatile memory, or a combination of a volatile memory and a nonvolatile memory. In addition, the storage 320 provides stored data according to a request by the controller 330.

The controller 330 controls overall operations of the terminal 120. For example, the controller 330 may transmit and receive signals through the transceiver 310. In addition, the controller 330 writes and reads data in the storage 320. In addition, the controller 330 may perform functions of a protocol stack required by the communication standard. To this end, the controller 330 may include at least one processor or a micro-processor, or may be a part of the processor. In addition, a part of the transceiver 310 and the controller 330 may be referred to a communication processor (CP). According to embodiments, the controller 330 may control the terminal 120 to perform operations according to various embodiments to be described later.

Figure 4:
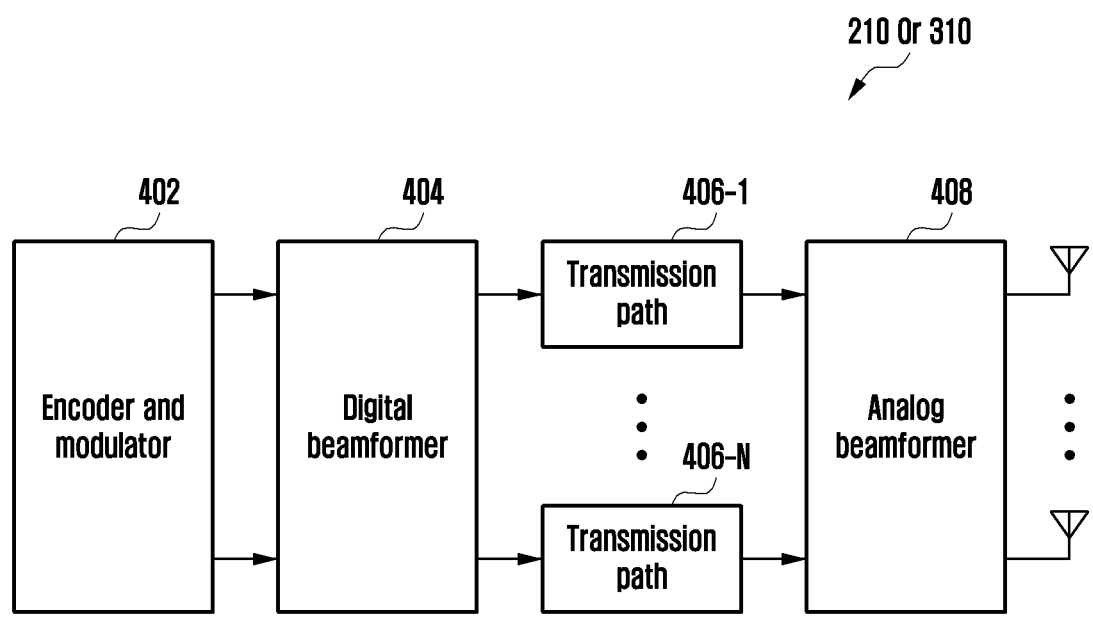
FIG. 4 is a block diagram illustrating a configuration of a communicator in a wireless communication system according to an embodiment of the disclosure.

FIG. 4 is a block diagram illustrating a configuration of a communicator in a wireless communication system according to an embodiment of the disclosure.

FIG. 4 illustrates an example of a detailed configuration of the wireless transceiver 210 of FIG. 2 or the transceiver 310 of FIG. 3. Specifically, FIG. 4 illustrates components for performing beamforming as a part of the wireless transceiver 210 of FIG. 2 or the transceiver 310 of FIG. 3.

Referring to FIG. 4, the wireless transceiver 210 or the transceiver 310 may include an encoding and modulator 402, a digital beamformer 404, a plurality of transmission paths 406-1 to 406-N, and an analog beamformer 408.

The encoding and modulator 402 may perform channel encoding. For channel encoding, at least one of a low density parity check (LDPC) code, a convolution code, and a polar code may be used. The encoding and modulator 402 generates modulation symbols by performing constellation mapping.

The digital beamformer 404 may perform beamforming on a digital signal (e.g., modulation symbols). To this end, the digital beamformer 404 may multiply the modulation symbols by beamforming weights. Here, the beamforming weights are used to change the magnitude and phase of a signal, and may be referred to a precoding matrix, a precoder, or the like. The digital beamformer 404 may output the digital beamformed modulation symbols to the plurality of transmission paths 406-1 to 406-N. In this case, according to a multiple input multiple output (MIMO) transmission scheme, modulation symbols may be multiplexed or the same modulation symbols may be provided to a plurality of transmission paths 406-1 to 406-N.

A plurality of transmission paths 406-1 to 406-N may convert the digital beamformed digital signals into analog signals. To this end, each of the plurality of transmission paths 406-1 to 406-N may include an inverse fast forwarder transform (IFFT) operator, a cyclic prefix (CP) insertion unit, a DAC, and an up-conversion unit. The CP insertion unit is for an orthogonal frequency division multiplexing (OFDM) scheme, and may be excluded when another physical layer scheme (e.g., filter bank multi-carrier (FBMC)) is applied. That is, the plurality of transmission paths 406-1 to 406-N may provide independent signal processing processes for a plurality of streams generated through digital beamforming. However, depending on the implementation method, some of the components of the plurality of transmission paths 406-1 to 406-N may be used in common.

The analog beamformer 408 may perform beamforming on an analog signal. To this end, the digital beamformer 404 may multiply the analog signals by beamforming weights. Here, the beamforming weights are used to change the magnitude and phase of a signal. Specifically, according to a plurality of transmission paths 406-1 to 406-N and a connection structure between antennas, the analog beamformer 408 may be variously configured. For example, each of a plurality of transmission paths 406-1 to 406-N may be connected to one antenna array. As another example, a plurality of transmission paths 406-1 to 406-N may be connected to one antenna array. As another example, a plurality of transmission paths 406-1 to 406-N may be adaptively connected to one antenna array or may be connected to two or more antenna arrays.

Figure 5:
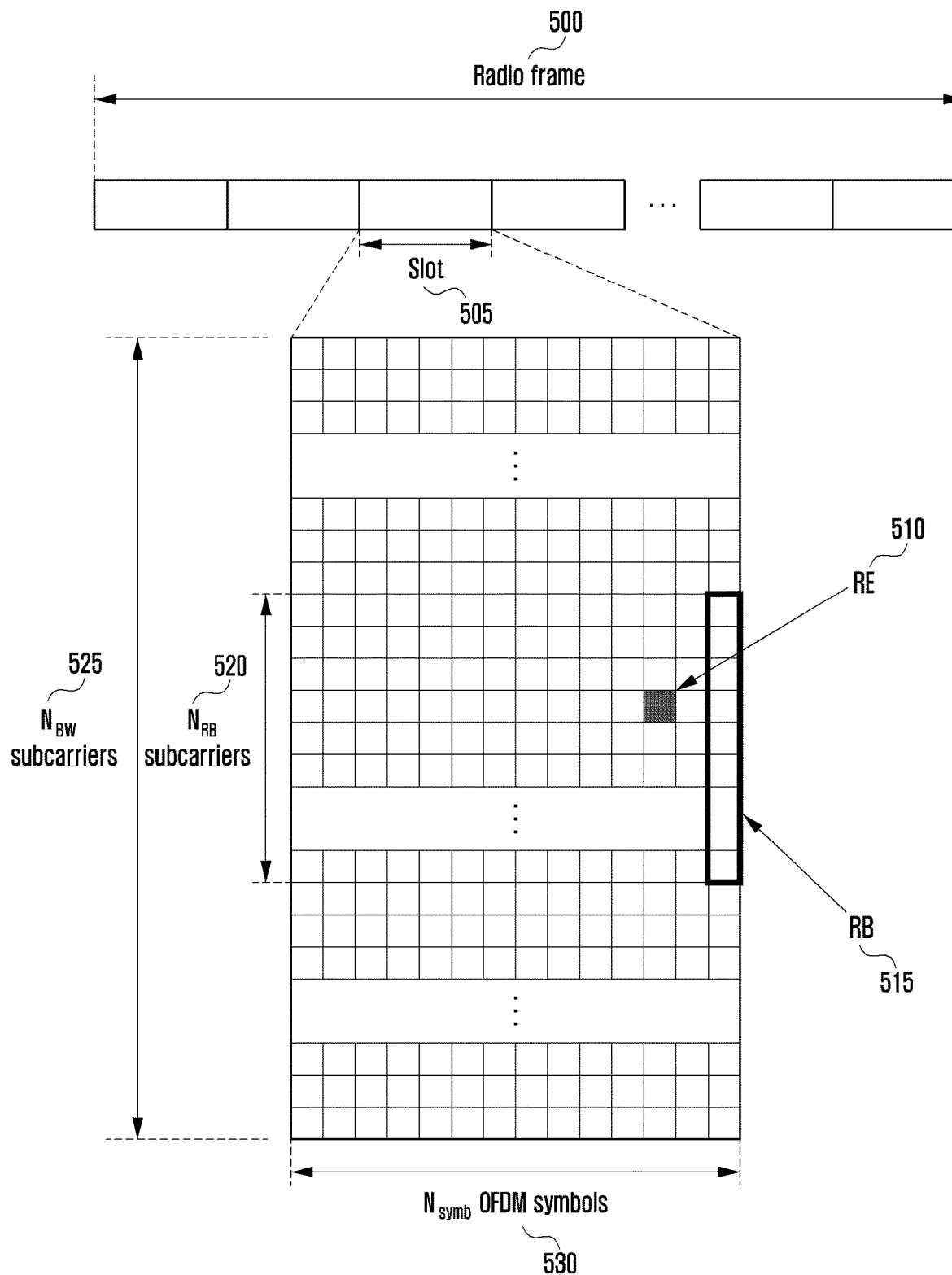
FIG. 5 is a block diagram illustrating a structure of a time-frequency resource of a wireless communication system according to an embodiment of the disclosure.

FIG. 5 is a block diagram illustrating a structure of a time-frequency resource of a wireless communication system according to an embodiment of the disclosure.

Referring to FIG. 5, in the radio resource domain, the horizontal axis represents the time domain and the vertical axis represents the frequency domain. The minimum transmitter in the time domain is an OFDM symbol or a discrete Fourier transform spread OFDM symbol (DFT-S-OFDM symbol), in which $N_{symb}$ OFDM symbols or DFT-S-OFDM symbols 530 are included in one slot 505. Unlike the slot, the length of the subframe in the NR system may be defined as 1.0 ms, and the length of the radio frame 500 may be defined as 10 ms. The minimum transmitter in the frequency domain is a subcarrier, and the bandwidth of the entire system transmission bandwidth may include a total of $N_{BW}$ subcarriers 525. Specific values such as $N_{symb}$ and $N_{BW}$ may be variably applied depending on the system.

The basic unit of the time-frequency resource domain is the resource element (RE) 510, which may be represented as an OFDM symbol index or a DFT-S-OFDM symbol index and a subcarrier index. The resource block RB 515 may be defined as $N_{RB}$ consecutive subcarriers 520 in the frequency domain. In general, the minimum transmitter of data is an RB unit, and in general, $N_{symb}=14$ and $N_{RB}=12$ in an NR system.

The structure of the time-frequency resource as illustrated in FIG. 5 may be applied to the Uu interface. In addition, the time-frequency resource structure illustrated in FIG. 5 may be similarly applied to the sidelink.

According to various embodiments of the disclosure, a method for a sidelink remote UE connected to a sidelink relay UE and maintaining an RRC connection mode with a base station to acquire a system information message (at least one or a combination of MIB, SIB1, other SIB(s), and posSIB(s)) may include one or a combination of the following.

(1) The sidelink remote UE may directly acquire a master information block (MIB) and a system information block (SIB) 1 transmitted from the base station through the Uu link with the base station, and may acquire other SIB(s) and posSIB(s) transmitted from the base station through the sidelink relay UE. The sidelink remote UE may acquire a system information message including the other SIB(s) and the posSIB(s) through the sidelink relay UE or through signaling transmitted from the base station to the sidelink remote UE through the sidelink relay UE.

(2) The sidelink remote UE may directly acquire the MIB and the SIB1 transmitted from the base station through the Uu link with the base station, and may acquire other SIB(s) and posSIB(s) transmitted from the base station through the sidelink relay UE. Other SIB(s) and posSIB(s) may be acquired by the sidelink remote UE requesting the base station to transmit other SIB(s) and posSIB(s). In this case, other SIB(s) and posSIB(s) transmission requests may be transmitted to the base station through the sidelink relay UE. The sidelink remote UE may acquire a system information message including the other SIB(s) and the posSIB(s) through the sidelink relay UE or through signaling transmitted from the base station to the sidelink remote UE through the sidelink relay UE. The operation procedure of requesting and acquiring transmission of at least one or combination of other SIB(s) and posSIB(s) to the base station through the sidelink relay UE may be the same as in FIG. 6.

(3) The sidelink remote UE may directly acquire the MIB transmitted from the base station through the Uu link with the base station, and may acquire the SIB 1, other SIB(s), and posSIB(s) transmitted from the base station through the sidelink relay UE. The SIB1, other SIB(s), and posSIB(s) may be acquired by the sidelink remote UE requesting the base station to transmit the SIB1, other SIB(s), and posSIB(s). In this case, The SIB1, other SIB(s), and posSIB(s) transmission requests may be transmitted to the base station through the sidelink relay UE. The sidelink remote UE may acquire the system information message including the SIB1, other SIB(s), and posSIB(s) through the sidelink relay UE, or through signaling transmitted from the base station to the sidelink remote UE through the sidelink relay UE.

When remote UE is not connected with relay UE (e.g., PC5 RRC connection between remote UE and relay UE is not established), remote UE follows the procedures in subclause 5.2.2.3 (acquisition of system information) of 3GPP TS 38.331. The remote UE's RRC state is one of RRC_CONNECTED, RRC_INACTIVE, RRC_IDLE.

When remote UE is connected with relay UE (e.g., PC5 RRC connection is established), remote UE follows the procedures below to acquire system information via relay UE. The remote UE's RRC state is one of RRC_CONNECTED, RRC_INACTIVE, RRC_IDLE.

Here, the operation of acquiring the MIB by the sidelink remote UE is as follows.

---

The sidelink remote UE:
- Apply the specified BCCH configuration
- Acquire the MIB as specified in subclause 5.2.2.3.1 of 3GPP TS 38.331
- If the UE is unable to acquire the MIB
  - ■ Perform the actions (e.g., consider the cell as barred) as specified in clause 5.2.2.5 of 3GPP TS 38.331
- Else
  - ■ Perform the actions (e.g., either 'consider the cell as barred' or 'apply the received systemFrameNumber, pdcch-ConfigSIB1, subCarrierSpacingCommon, ssb-SubcarrierOffset, dmrs-TypeA-Position') specified in clause 5.2.2.4.1 of 3GPP TS 38.331

---

The operation of acquiring the SIB1 by the sidelink remote UE is as follows. If it is determined that the sidelink remote UE cannot acquire SIB1 according to the operation procedures of FIGS. 7, 8A, 8B, 9A, and 9B, for example, the sidelink remote UE may determine that a problem has occurred in the sidelink connection with the sidelink relay UE and may determine to trigger the sidelink relay UE re-selection procedure.

---

The sidelink remote UE:
2> if SIB1 acquisition is required for the UE:
   3> acquire the SIB1 via PC5 RRC with relay UE (using FIG. 7, FIG. 8a, FIG. 8b, FIG. 9a, FIG. 9b)
   3> if the UE is unable to acquire the SIB1:
      4> UE may trigger/perform relay reselection procedure;
   3> else:
      4> upon acquiring SIB1, perform the actions specified in clause 5.2.2.4.2 in 3GPP TS 38.331.

---

Figure 6:
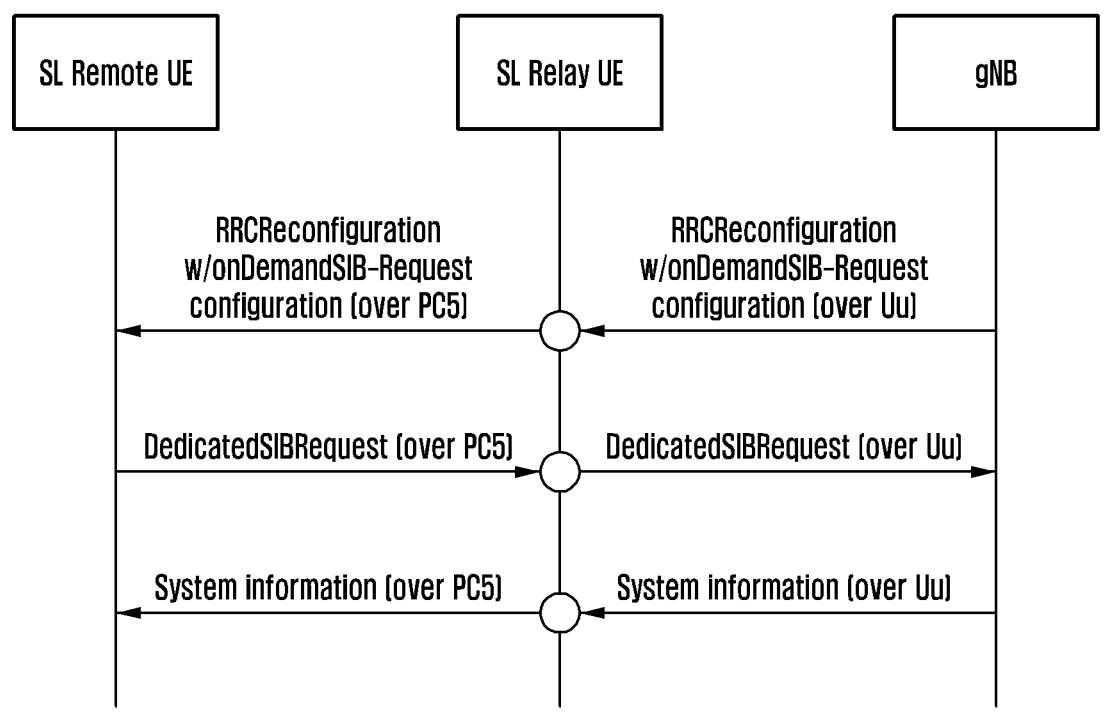
FIG. 6 is a flowchart illustrating an operation of a sidelink remote terminal requesting and acquiring a system information message according to an embodiment of the disclosure.

The operation of the sidelink remote UE acquiring other SIB(s) and posSIB(s) may be the same as that of FIG. 6.

(4) The sidelink remote UE may acquire the MIB, the SIB1, other SIB(s), and posSIB(s) transmitted from the base station through the sidelink relay UE. The MIB, the SIB1, other SIB(s), and posSIB(s) may be acquired by the sidelink remote UE requesting the base station to transmit the MIB, the SIB1, other SIB(s), and posSIB(s). In this case, the MIB, the SIB1, other SIB(s), and posSIB(s) transmission requests may be transmitted to the base station through the sidelink relay UE. The sidelink remote UE may acquire the system information message including the MIB, the SIB1, other SIB(s), and posSIB(s) through the sidelink relay UE, or through signaling transmitted from the base station to the sidelink remote UE through the sidelink relay UE.

An operation in which the sidelink remote UE acquires at least one or a combination of MIB and SIB1 through the sidelink relay UE is as illustrated in FIGS. 7, 8A, 8B, 9A, or 9B. An operation in which the sidelink remote UE acquires at least one or a combination of other SIB(s) and posSIB(s) through the sidelink relay UE may be the same as that of FIG. 6.

(5) The sidelink remote UE may acquire the MIB, the SIB1, other SIB(s), and posSIB(s) transmitted from the base station through the sidelink relay UE. The sidelink relay UE may transmit the MIB from a predetermined resource of the PC5 link, and the sidelink remote UE may acquire the MIB from the predetermined resource of the PC5 link. The sidelink remote UE may acquire the SIB1, other SIB(s), and posSIB(s) by requesting the base station to transmit the SIB1, other SIB(s), and posSIB(s). In this case, the SIB1, other SIB(s), and posSIB(s) transmission requests may be transmitted to the base station through the sidelink relay UE. The sidelink remote UE may acquire the system information message including the SIB1, other SIB(s), and posSIB(s) through the sidelink relay UE, or through signaling transmitted from the base station to the sidelink remote UE through the sidelink relay UE. An operation in which the sidelink remote UE acquires the SIB1 is as illustrated in FIGS. 7, 8A, 8B, 9A, or 9B. An operation in which the sidelink remote UE acquires at least one or a combination of other SIB(s) and posSIB(s) may be the same as that of FIG. 6.

Sidelink relay UE can relay Uu MIB via PC5 to sidelink remote UE. The MIB can be transmitted in physical sidelink broadcast channel (PSBCH) blocks. A sidelink remote UE assumes that reception occasions of a PSBCH, S-PSS, and S-SSS are in consecutive symbols and form a S-SS/PSBCH block. A sidelink remote UE is provided, by sl-NumSSB-WithinPeriod, a number $N_{period}^{S\text{-}SSB}$ of S-SS/PSBCH blocks in a period of X frames.

When it is necessary to acquire at least one or a combination of other SIBs and posSIBs among the system information messages, the terminal in the RRC connection mode capable of transmitting and receiving data to and from the base station through the Uu interface may perform a procedure of transmitting the system information request message to the base station. In this case, the system information request message transmitted from the terminal to the base station may correspond to the DedicatedSIBRequest message. In a case where the sidelink remote UE is connected to the sidelink relay UE using the sidelink direct communication while maintaining the RRC connection mode with the base station, when it is necessary to acquire at least one or a combination of other SIBs and posSIBs among the system information messages, the sidelink remote UE may transmit the system information request message, DedicatedSIBRequest message, to the base station through the sidelink relay UE.

A procedure for exchanging a system information request message for at least one or a combination of other SIB(s) and posSIB(s), DedicatedSIBRequest message, and system information message including at least one or a combination of other SIB(s) and posSIB(s) between the sidelink remote UE, the sidelink relay UE, and the base station is as follows (FIG. 6).

FIG. 6 is a flowchart illustrating an operation of a sidelink remote UE requesting and acquiring a system information message according to an embodiment of the disclosure.

For RRC_CONNECTED remote UE, DedicatedSIBRequest message is used for the remote UE to request the SIB(s) other than SIB1/MIB via relay UE. The SIB(s) can be other SIB(s) except SIB1/MIB or posSIB(s).

For RRC_CONNECTED remote UE, DedicatedSIBRequest message can be used for the remote UE to request the other SIB(s) or posSIB(s) via relay UE if the remote UE has not acquired other SIB(s) or posSIB(s). For the delivery of remote UE's DedicatedSIBRequest message, gNB configures the PC5 radio link control (RLC) channel and Uu RLC channel in the dedicated RRC signaling with remote UE (PC5 RLC channel configuration for DedicatedSIBRequest) and in the dedicated RRC signaling with relay UE (PC5 RLC channel and Uu RLC channel configuration for DedicatedSIBRequest). PC5 RLC service data unit (SDU) carrying DedicatedSIBRequest message is delivered in relay UE's adapt layer and relay UE maps the PC5 RLC to Uu RLC toward gNB. Uu RLC SDU (Uu packet data convergence protocol (PDCP) protocol data unit (PDU)) carrying DedicatedSIBRequest message is delivered to gNB. After receiving remote UE's DedicatedSIBRequest message via relay UE, gNB can send RRCReconfiguration with SIB(s) which can contain the requested SIB(s) e.g., other SIB(s), posSIB(s) by remote UE. The RRCReconfiguration message is forwarded to remote UE via the relay UE using Uu RLC and PC5 RLC configuration for the remote UE's RRCReconfiguration.

To transmit DedicatedSIBRequest message via relay UE over PC5, Remote UE is provided with on-demand system information (SI) request configuration in RRCReconfiguration message from gNB via relay UE. The RRCReconfiguration message includes onDemandSIB-Request and onDemandSIB-RequestProhibitTimer (Txxxx e.g., T350).

When remote UE requires other SIB(s) or posSIB(s):

If the remote UE is in RRC_CONNECTED and the remote UE has not stored a valid version of other SIB or posSIB, of one or several required other SIB(s) or posSIB(s):

for the SI message(s) that, according to the si-SchedulingInfo or posSI-SchedulingInfo in the stored SIB1, contain at least one required SIB or requested posSIB:

>> if onDemandSIB-Request is configured and timer Txxxx (e.g., T350) is not running:

>> initiate transmission of the DedicatedSIBRequest message;

>> start timer Txxxx (e.g., T350) with the timer value set to the onDemandSIB-RequestProhibitTimer;

Note that UE does not check for Common Search Space and si-BroadcastStatus bit in SIB1

Remote UE receives RRCReconfiguration message from gNB via relay UE. RRCReconfiguration message includes onDemandSIB-Request and onDemandSIB-RequestProhibitTimer (Txxxx e.g., T350) for SIB(s), posSIB(s).

The operation of the sidelink remote UE according to the procedure of FIG. 6 is as follows.

```
5.2.2.3.5-1 Acquisition of SIB(s) or posSIB(s) of remote UE in RRC_CONNECTED
    1>    if the UE is in RRC_CONNECTED and the UE has not stored a valid version of a SIB
          or posSIB, in accordance with sub-clause 5.2.2.2.1 in 3GPP TS 38.331, of one or several
          required SIB(s) or posSIB(s) in accordance with sub-clause 5.2.2.1 in 3GPP TS 38.331:
          2>   for the SI message(s) that, according to the si-SchedulingInfo or posSI-SchedulingInfo
               in the stored SIB1, contain at least one required SIB or requested posSIB:
               3>   if onDemandSIB-Request is configured and timer T350-like which is configured
                    by gNB to remote UE in remote UE's RRCReconfigruation message is not
                    running:
    4>    initiate transmission of the DedicatedSIBRequest message via PC5 with relay UE (the
          composition of DedicatedSIBRequest message follows subclause 5.2.2.3.6) The PC5
          RLC configuration for SRB1 DedicatedSIBRequest message is applied (the PC5 RLC
          configuration for SRB1 DedicatedSIBRequest message is configured by gNB to remote
          UE in remoteUE's RRCReconfiguration message);
    4>    start timer Txxxx with the timer value set to the onDemandSIB-
          RequestProhibitTimer(which is configured by gNB to remote UE in remote UE's
          RRCReconfiguration message);
    1>    else if the UE is in RRC_CONNECTED and the UE has not stored a valid version of a
          SIB or posSIB, in accordance with sub-clause 5.2.2.2.1 in 3GPP TS 38.331, of one or
          several required SIB(s) or posSIB(s) in accordance with sub-clause 5.2.2.1 in 3GPP TS
          38.331:
          2>   for the SI message(s) that, according to the si-SchedulingInfo in the stored SIB1,
               contain at least one required SIB and for which si-BroadcastStatus is set to
               broadcasting:
               3>   acquire the SI message(s) via PC5 with relay UE; (it is assumed that relay UE
                    transmits the SIBs over PC5 to remote UE.)
          2>   for the SI message(s) that, according to the posSI-SchedulingInfo in the stored SIB1,
               contain at least one requested posSIB and for which posSI-BroadcastStatus is set to
               broadcasting:
               3>   acquire the SI message(s) via PC5 with relay UE; (it is assumed that relay UE
                    transmits the posSIB(s) over PC5 to remote UE.)
NOTE: UE may include on demand request for SIB(s) and/or posSIB(s) in the same
DedicatedSIBRequest message which is transmitted via relay UE over PC5.
5.2.2.3.6 Actions related to transmission of DedicatedSIBRequest message
The UE shall set the contents of DedicatedSIBRequest message as follows:
    1>    if the procedure is triggered to request the required SIB(s):
          2>   include requestedSIB-List in the onDemandSIB-RequestList to indicate the requested
               SIB(s);
    1>    if the procedure is triggered to request the required posSIB(s):
          2>   include requestedPosSIB-List in the onDemandSIB-RequestList to indicate the
               requested posSIB(s).
The UE shall submit the DedicatedSIBRequest message to lower layers for transmission.
```

The procedure of FIG. 6 is not applied to the case that the sidelink remote UE requests MIB or SIB1 transmission.

Since the legacy on-demand system information request and delivery procedure using DedicatedSIBRequest is not used for MIB and SIB1 in RRC_CONNECTED, it is not clear how to handle MIB and SIB1 for remote UE in RRC_CONNECTED where the remote UE is connected with relay UE over PC5.

In the case of a sidelink remote UE connected to a sidelink relay UE and in an RRC connection mode with the gNB, it is necessary to acquire information of the MIB or SIB1. In particular, in the case of SIB1, scheduling information on other SIB(s) and posSIB(s), validation information on other SIB(s) and posSIB(s), and information such as public land mobile network (PLMN) identifier (ID), cell ID, unified access control (UAC) configuration, tracking area info, etc. may be provided to the sidelink remote UE. In order for the sidelink remote UE to determine the validity of other SIB(s) and posSIB(s), or whether other SIB(s) and posSIB(s) are provided, and to perform a procedure in which the sidelink remote UE requests a system information message to the gNB through the sidelink relay UE as in the procedure of FIG. 6, the sidelink remote UE needs to acquire the SIB1. The sidelink remote UE may acquire transmission information of the SIB1 by acquiring information of the MIB transmitted from the gNB. As a method for the sidelink remote UE to acquire at least one of the MIB and the SIB1, a procedure in which the sidelink relay UE, which is establishing a connection with the sidelink remote UE, periodically continues to transmit the MIB or the SIB1 through the sidelink connection, may be used. This may correspond to a case where the sidelink relay UE transmits the MIB or the SIB1 without a request from the sidelink remote UE. This method has a disadvantage in that sidelink resources are consumed because the MIB or the SIB1 must be transmitted periodically and continuously regardless of whether the MIB or the SIB1 is required for the sidelink remote UE.

As an embodiment of the disclosure, when it is determined that the MIB or the SIB1 is required, the sidelink remote UE connected to the sidelink relay UE and maintaining the RRC connection mode with the gNB may perform a procedure of requesting the MIB or the SIB1 transmission to the gNB through the sidelink relay UE. The sidelink relay UE may transmit the MIB or the SIB1 transmitted by the gNB to the sidelink remote UE. Alternatively, the gNB may transmit the MIB or the SIB1 to the sidelink remote UE through the sidelink relay UE. In a case where the sidelink remote UE acquires the MIB or the SIB1 from the gNB through the sidelink relay UE, the sidelink remote UE may determine scheduling, validity, etc. of other SIB(s) and posSIB(s), and if necessary, may perform the procedure of FIG. 6 for requesting system information on other SIB(s) and posSIB(s) based on the information of the MIB or the SIB1.

Since SIB1 provides the scheduling info for other SIB(s) or pos-SIB(s), validity info for other SIB(s) or pos-SIB(s) as well as UAC (unified access control), PLMN ID info, cell ID info, tracking area info, remote UE may acquire the SIB1 to check whether it need to request/can request other SIB(s) or pos-SIB(s) while it is in RRC_CONNECTED via relay UE over PC5. Remote UE in RRC_CONNECTED can request SIB1 on demand via relay UE if needed.

In the case of transmitting a system information message (at least one or a combination of MIB, SIB1, other SIB(s), and posSIB(s)) to the sidelink remote UE connected to the sidelink relay UE, the corresponding system information message may be segmented to be transmitted through the sidelink connection. In the case of transmitting a system information message (at least one or a combination of MIB, SIB1, other SIB(s), and posSIB(s)) to the sidelink remote UE connected to the sidelink relay UE, the corresponding system information message may be a system information message reconfigured to include only information necessary for the sidelink remote UE to be transmitted through the sidelink connection. The segmentation of the system information message transmitted to the sidelink remote UE through the sidelink relay UE may be processed by the gNB or may be processed by the sidelink relay UE. The reconfiguration of the system information message transmitted to the sidelink remote UE through the sidelink relay UE may be processed by the gNB or may be processed by the sidelink relay UE.

The SIB segmentation over PC5 and/or SIB delivery without unnecessary SIB contents over PC5 is to carry the large size of MIB/SIB(s) over PC5. Either or both (SIB segmentation for remote UE or SIB recomposition for remote UE) can be used to solve the overhead/large size of MIB/SIB(s) over PC5.

According to an embodiment of the disclosure, the gNB that is connected to the sidelink relay UE and transmits at least one of the MIB or the SIB1 according to the request of the sidelink remote UE in the RRC connection mode may segment and/or reconfigure the MIB or the SIB1 and transmit the same to the sidelink remote UE through the sidelink relay UE. In this case, the gNB may segment or/and reconfigure the MIB or the SIB1 to be transmitted to the sidelink remote UE, transmit the information to the sidelink relay UE, and the sidelink relay UE may transmit the received MIB or SIB1 to the sidelink remote UE.

As one example, when gNB receives SIB1 request by remote UE in RRC_CONNECTED via relay UE, gNB can provide SIB1 which is same as transmitted over Uu (i.e., same contents as Uu SIB1) or modified SIB1 (i.e., parts of Uu SIB1, necessary information (e.g., SIB scheduling info for other SIB(s) or pos-SIB(s), validity info for other SIB(s) or pos-SIB(s)) for the remote UE in RRC_CONNECTED via relay UE).

According to an embodiment of the disclosure, in the case of transmitting at least one of the MIB and the SIB1 according to a request of the sidelink remote UE connected to the sidelink relay UE and in an RRC connection mode, the sidelink relay UE may segment or/and reconfigure the MIB or the SIB1 and transmit the same to the sidelink remote UE. In this case, the gNB transmits the MIB or the SIB1 to be transmitted to the sidelink remote UE to the sidelink relay UE, and the sidelink relay UE may segment and/or reconfigure the MIB or the SIB1 to be transmitted to the sidelink remote UE, and transmit the same to the sidelink remote UE.

As another example, when relay UE receives SIB1 request by remote UE in RRC_CONNECTED via relay UE, relay UE can provide SIB1 which is same as received over Uu (i.e., same contents as Uu SIB1) or modified SIB1 (i.e., parts of Uu SIB1, necessary information e.g., SIB scheduling info for other SIB(s) or pos-SIB(s), validity info for other SIB(s) or pos-SIB(s)) for the remote UE in RRC_CONNECTED via relay UE).

According to an embodiment of the disclosure, when transmitting at least one of the MIB or the SIB1 to a sidelink remote UE connected to the sidelink relay UE and in an RRC connection mode, the sidelink relay UE, the sidelink relay UE may segment and/or reconfigure the MIB or the SIB1 and transmit the sane to the sidelink remote UE through the sidelink relay UE. In this case, the sidelink remote UE may acquire the MIB or the SIB1 transmitted from the gNB, and segment and/or reconfigure the MIB or the SIB1 so that the MIB or the SIB1 may be transmitted to the sidelink remote UE.

As other example, when relay UE acquires SIB1 over Uu and it is configured to provide SIB1 to remote UE in RRC_CONNECTED via relay UE, relay UE can provide SIB1 which is same as received over Uu (i.e., same contents as Uu SIB1) or modified SIB1 (i.e., parts of Uu SIB1, necessary information e.g., SIB scheduling info for other SIB(s) or pos-SIB(s), validity info for other SIB(s) or pos-SIB(s)) for the remote UE in RRC_CONNECTED via relay UE).

Figure 7:
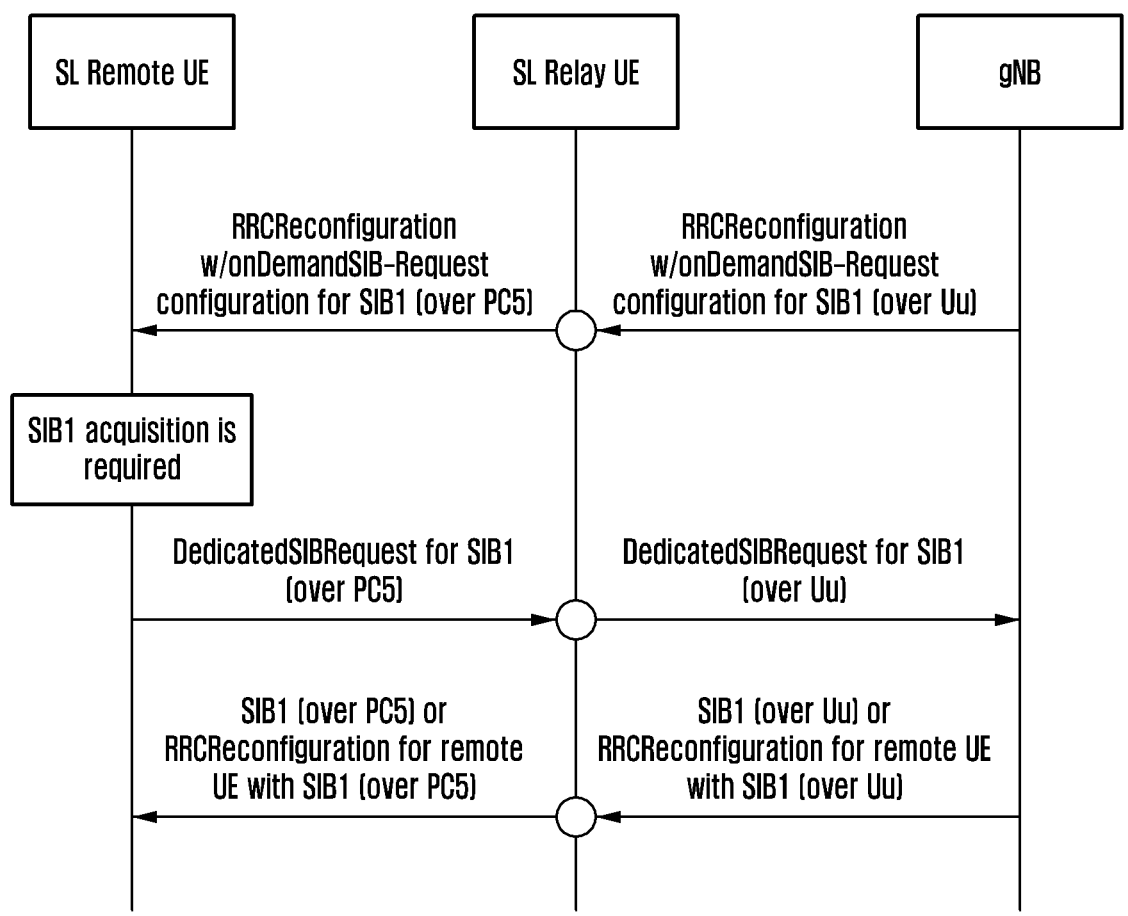
FIG. 7 is a diagram illustrating an operation of a sidelink remote terminal acquiring a system information message according to an embodiment of the disclosure.

FIG. 7 is a diagram illustrating an operation of a sidelink remote UE acquiring a system information message according to an embodiment of the disclosure.

FIG. 7 is an embodiment of performing an operation of determining that at least one or a combination of the MIB or the SIB1 is required by the sidelink remote UE in an RRC connection mode and establishing a connection with the sidelink relay UE, and requesting and acquiring transmission of the MIB or the SIB1.

The sidelink remote UE may acquire on-demand SIB request configuration information capable of requesting a system information message for at least one or a combination of the MIB or the SIB1 from the gNB through the sidelink relay UE. The onDemandSIB-Request configuration may include at least one or a combination of onDemandSIB-Request for SIB1/MIB and onDemandSIB-RequestProhibitTimer (Txxxx e.g., T350) for SIB1/MIB. If it is determined that there is no valid MIB or SIB1 information and configured to request the MIB or the SIB1, the sidelink remote UE may configure the DedicatedSIBRequest message and transmit the configured message to the gNB through the sidelink relay UE. The DedicatedSIBRequest message may include information indicating the MIB or the SIB1 required by the sidelink remote UE. The gNB may acquire the DedicatedSIBRequest message transmitted from the sidelink remote UE through the sidelink relay UE. The gNB may provide MIB and SIB1 information to the sidelink remote UE, which may be transmitted in MIB format or SIB1 format in the UU link between the gNB and the sidelink relay UE, or may be transmitted including the MIB and the SIB1 in an RRCReconfiguration message destined for the sidelink remote UE. The sidelink relay UE may transmit the MIB format or the SIB1 format through the sidelink, or may transmit the RRCReconfiguration message (including MIB and/or SIB1) destined for the sidelink remote UE to the sidelink remote UE. Here, in a case where the sidelink relay UE transmits the MIB format or SIB1 format to the sidelink remote UE, the MIB or the SIB1 may be transmitted through SL-SRB through which a Sidelink RRC message is transmitted, through SL-SRB through which Sidelink PC5-S signaling is transmitted, or may be transmitted through a different sidelink signaling bearer.

For RRC_CONNECTED remote UE, DedicatedSIBRequest message is used for the remote UE to request the MIB or the SIB1 via relay UE.

For RRC_CONNECTED remote UE, DedicatedSIBRequest message can be used for the remote UE to request the MIB or the SIB1 via relay UE if the remote UE has not acquired MIB or SIB1 but the remote UE requires MIB or SIB1. For the delivery of remote UE's DedicatedSIBRequest message, gNB configures the PC5 RLC channel and Uu RLC channel in the dedicated RRC signaling with remote UE (PC5 RLC channel configuration for DedicatedSIBRequest) and relay UE (PC5 RLC channel and Uu RLC channel configuration for DedicatedSIBRequest). PC5 RLC SDU carrying DedicatedSIBRequest message is delivered in relay UE's adapt layer and relay UE map the PC5 RLC to Uu RLC toward gNB. Uu RLC SDU (Uu PDCP PDU) carrying DedicatedSIBRequest message is delivered in gNB. After receiving remote UE's DedicatedSIBRequest message via relay UE, gNB can send RRCReconfiguration with MIB, SIB(s) which can contain the requested MIB, SIB(s) by remote UE. The RRCReconfiguration message is forwarded to remote UE via relay UE using Uu RLC and PC5 RLC configuration for the remote UE's RRCReconfiguration.

Here, as one example, DedicatedSIBRequest message can be modified DedicatedSIBRequest including MIB, SIB1 in onDemandSIB-RequestList. As another example, a new RRC signaling can be defined for on demand MIB request or on demand SIB1 request.

---

Sidelink Remote UE:
1> if the UE is in RRC_CONNECTED and the UE has not stored a valid version of a MIB or SIB1 and MIB or SIB1 acquisition is required:
    2> if onDemandSIB-RequestList is configured for MIB or SIB1 and timer Txxxx which is configured by gNB to remote UE in remote UE's RRCReconfigruation message is not running:
        3> initiate transmission of the DedicatedSIBRequest message via PC5 with relay UE (the composition of DedicatedSIBRequest message follows subclause 5.2.2.3.6) The PC5 RLC configuration for SRB1 DedicatedSIBRequest message is applied (the PC5 RLC configuration for SRB1 DedicatedSIBRequest message is configured by gNB to remote UE in remoteUE's RRCReconfiguration message);
        3> start timer Txxxx with the timer value set to the onDemandSIB-RequestProhibitTimer(which is configured by gNB to remote UE in remote UE's RRCReconfiguration message);
5.2.2.3.6 Actions related to transmission of DedicatedSIBRequest message
The UE shall set the contents of DedicatedSIBRequest message as follows:
    1> if the procedure is triggered to request the SIB1:
        2> include required-SIB1 in the onDemandSIB-RequestList to indicate the requested SIB1;
    1> if the procedure is triggered to request the MIB:
        2> include required-MIB in the onDemandSIB-RequestList to indicate the requested MIB.
The UE shall submit the DedicatedSIBRequest message to lower layers for transmission.

Figure 8A:
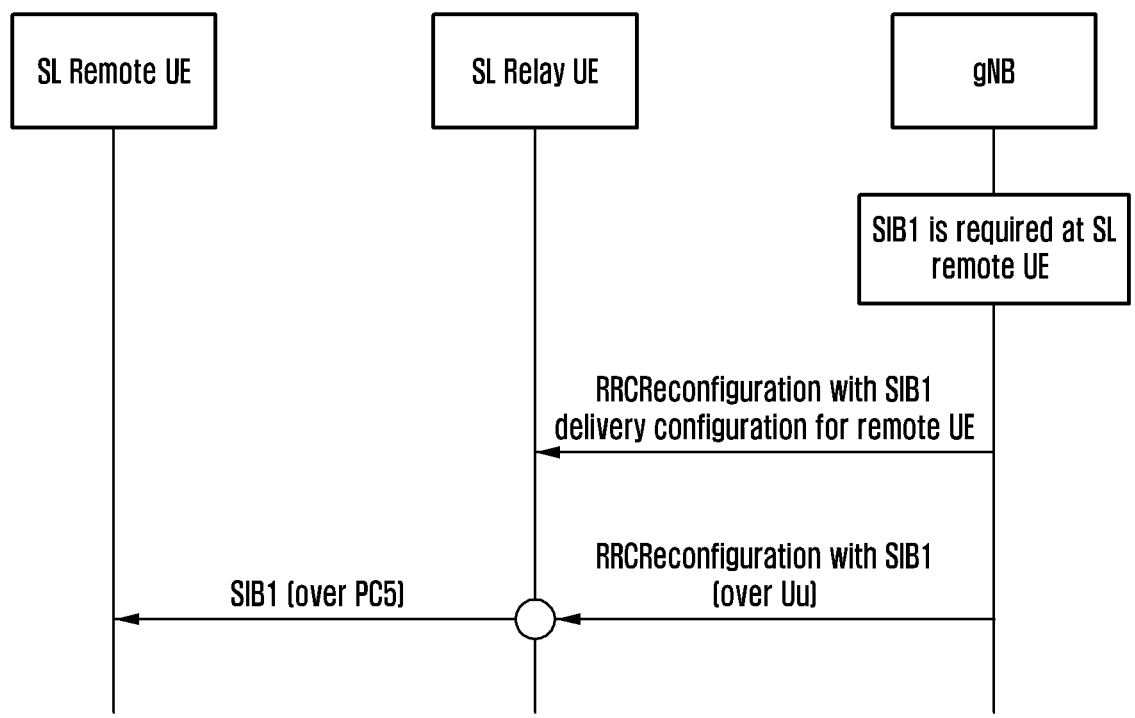
FIGS. 8A and 8B are diagrams illustrating an operation of a sidelink remote terminal acquiring a system information message according to various embodiments of the disclosure.
Figure 8B:
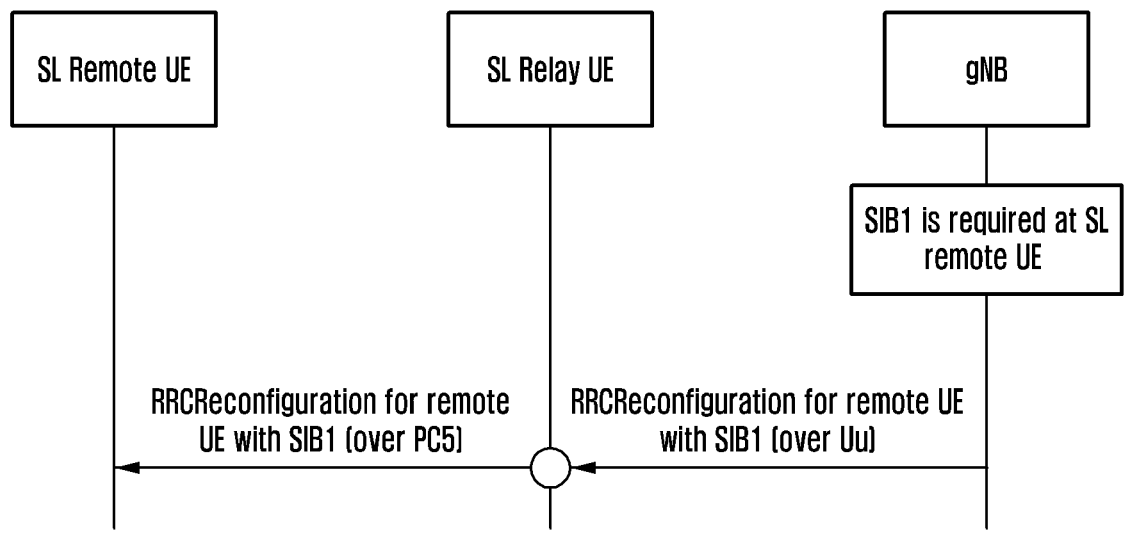

FIGS. 8A and 8B are diagrams illustrating an operation of a sidelink remote UE acquiring a system information message according to various embodiments of the disclosure.

FIGS. 8A and 8B are embodiments of an operation of performing a procedure for the sidelink remote UE in RRC connection mode and establishing a connection with the sidelink relay UE to acquire at least one or combination of the MIB or the SIB1 through the sidelink relay UE.

Referring to FIG. 8A, the gNB may determine whether the sidelink remote UE connected through the sidelink relay UE needs to acquire the SIB1 or the MIB. For example, this may correspond to a case where common search space is not configured in the active bandwidth part (BWP) of the sidelink relay UE, and thus the sidelink relay UE may not acquire SIB1 broadcast transmitted, and it is determined that it is necessary to acquire SIB1 information from the sidelink remote UE connected to the sidelink relay UE. In addition, the gNB may provide configuration information for notifying the sidelink relay UE whether MIB or SIB1 information needs to be transmitted to the sidelink remote UE connected to the sidelink relay UE through the sidelink. Based on the configuration information, when the sidelink relay UE acquires the SIB1 or the MIB from the gNB, it may be determined that it is necessary to transmit the SIB1 or the MIB to the sidelink remote UE connected thereto. In a case where the sidelink relay UE processes the SIB1 for the sidelink remote UE, the sidelink relay UE may be configured to transmit SIB1 information to the sidelink remote UE through the sidelink, and if the sidelink relay UE cannot acquire the SIB1 broadcast transmitted from the gNB because the common search space is not configured in the sidelink relay UE's active BWP, and it is determined that the gNB has acquired the SIB1 provided by RRCReconfiguration, the sidelink relay UE may transmit the SIB1 acquired in the RRCReconfiguration to the sidelink remote UE through the sidelink connection. In a case where the sidelink relay UE processes the MIB for the sidelink remote UE, the sidelink relay UE may be configured to transmit MIB information to the sidelink remote UE through the sidelink, and if it is determined that the sidelink relay UE has acquired the MIB from the gNB, the sidelink relay UE may transmit the MIB to the sidelink remote UE through the sidelink connection. The sidelink remote UE may acquire the SIB1 or the MIB transmitted from the sidelink relay UE connected through the sidelink. In a case where the sidelink remote UE in the RRC connection mode with the gNB is connected to the gNB through the sidelink relay UE, the sidelink remote UE does not perform an operation of determining whether the common search space is configured in its active BWP. Here, the SIB1 or the MIB transmitted from the sidelink relay UE to the sidelink remote UE may be transmitted through the SL-SRB through which the sidelink RRC message is transmitted, the SL-SRB through which the sidelink PC5-S signaling is transmitted, or through a different sidelink signaling bearer.

Referring to FIG. 8B, the gNB may determine whether the sidelink remote UE connected through the sidelink relay UE needs to acquire the SIB1 or the MIB. For example, this may correspond to a case where common search space is not configured in the active BWP of the sidelink relay UE, and thus the sidelink relay UE may not acquire SIB1 broadcast transmitted, and it is determined that it is necessary to acquire SIB1 information from the sidelink remote UE connected to the sidelink relay UE. If it is determined that the MIB or the SIB1 is necessary for the sidelink remote UE connected to the sidelink relay, the gNB may configure RRCReconfiguration including the MIB or the SIB1 and may transmit the RRCReconfiguration to the sidelink remote UE. The destination of the RRCReconfiguration message including the MIB or the SIB1 is the sidelink remote UE. The RRCReconfiguration message including the MIB or the SIB1 may be transmitted to the sidelink remote UE through relay transmission of the sidelink relay UE to which the sidelink remote UE is connected. The sidelink remote UE may acquire the SIB1 or the MIB by receiving the RRCReconfiguration message including the SIB1 or the MIB transmitted from the sidelink relay UE connected through the sidelink. In a case where the sidelink remote UE in the RRC connection mode with the gNB is connected to the gNB through the sidelink relay UE, the sidelink remote UE does not perform an operation of determining whether the common search space is configured in its active BWP. The gNB may transmit PC5 RLC configuration and Uu RLC configuration mapping information for transmitting and receiving the RRCReconfiguration message including the SIB1 or the MIB to and from the sidelink relay UE, and may transmit PC5 RLC configuration for transmitting and receiving the RRCReconfiguration message including the SIB1 or the MIB to and from the sidelink relay UE.

For RRC_CONNECTED remote UE, gNB can transmit SIB1 in the remote UE's RRCReconfiguration via relay UE. It is assumed that gNB knows which relay UE and which remote UE are connected via PC5 and whether relay UE's active BWP is configured with common search space or not. If relay UE is in RRC_CONNECTED with an active BWP not configured with common search space with the field searchSpaceOtherSystemInformation SIB1 is not transmitted in common search space, the SIB1 is delivered in dedicated RRCReconfiguration to the relay UE. When remote UE is connected to gNB via relay UE the remote UE does not check whether active BWP is configured with common search space or not to acquire SIB1.

As an example, relay UE, if it has received SIB1 in its RRCReconfiguration, can transmit SIB1 to remote UE over PC5. gNB can configure the information with relay UE (whether relay UE can forward SIB1 in its RRCReconfiguration to remote UE via PC5). Remote UE gets SIB1 by relay UE transmitted over PC5.

As another example, gNB can transmit RRCReconfiguration with SIB1 to remote UE via relay UE over PC5. In this example gNB can transmit relay UE's RRCReconfiguration with SIB1 to relay UE. For the delivery of remote UE's RRCReconfiguration with SIB1, gNB configures the PC5 RLC channel and Uu RLC channel in the dedicated RRC signaling with remote UE (PC5 RLC channel configuration for RRCReconfiguration) and relay UE (PC5 RLC channel and Uu RLC channel configuration for RRCReconfiguration). Remote UE gets SIB1 in the RRCReconfiguration from gNB which is forwarded via Relay UE with PC5 RLC channel configuration.

Figure 9A:
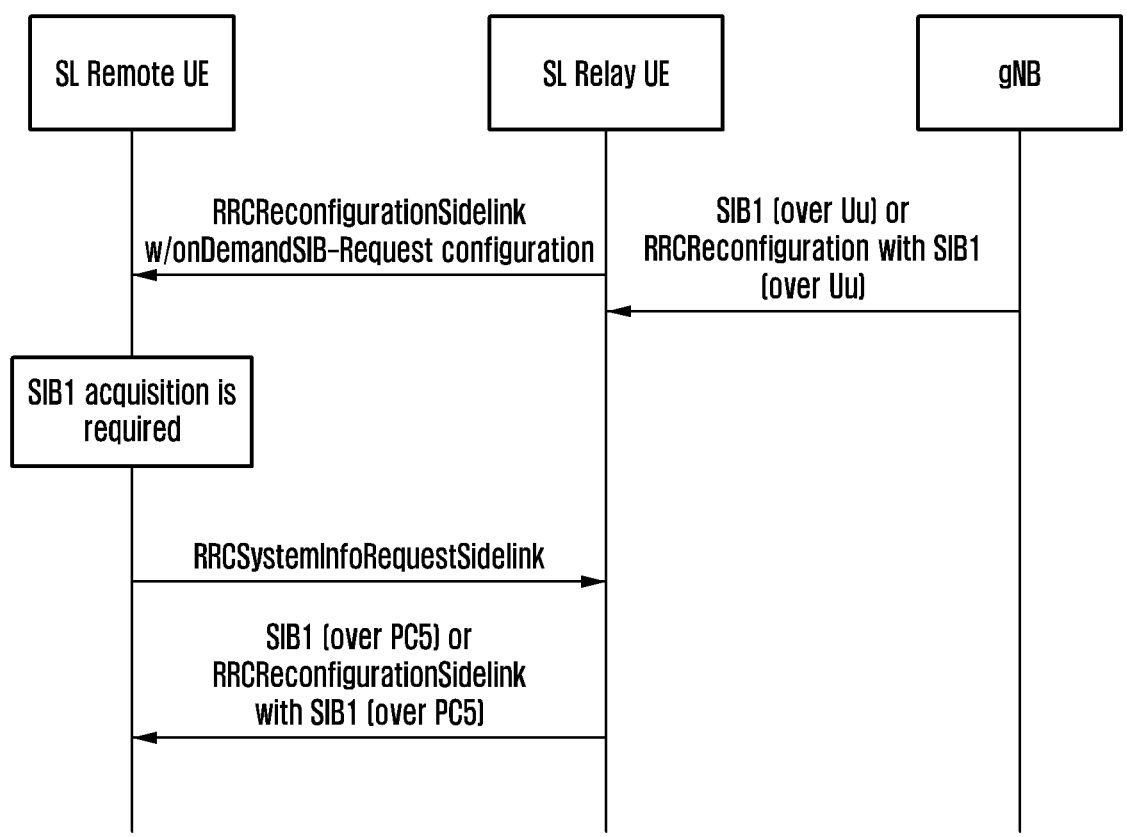
FIGS. 9A and 9B are diagrams illustrating an operation of a sidelink remote terminal acquiring a system information message according to various embodiments of the disclosure.
Figure 9B:
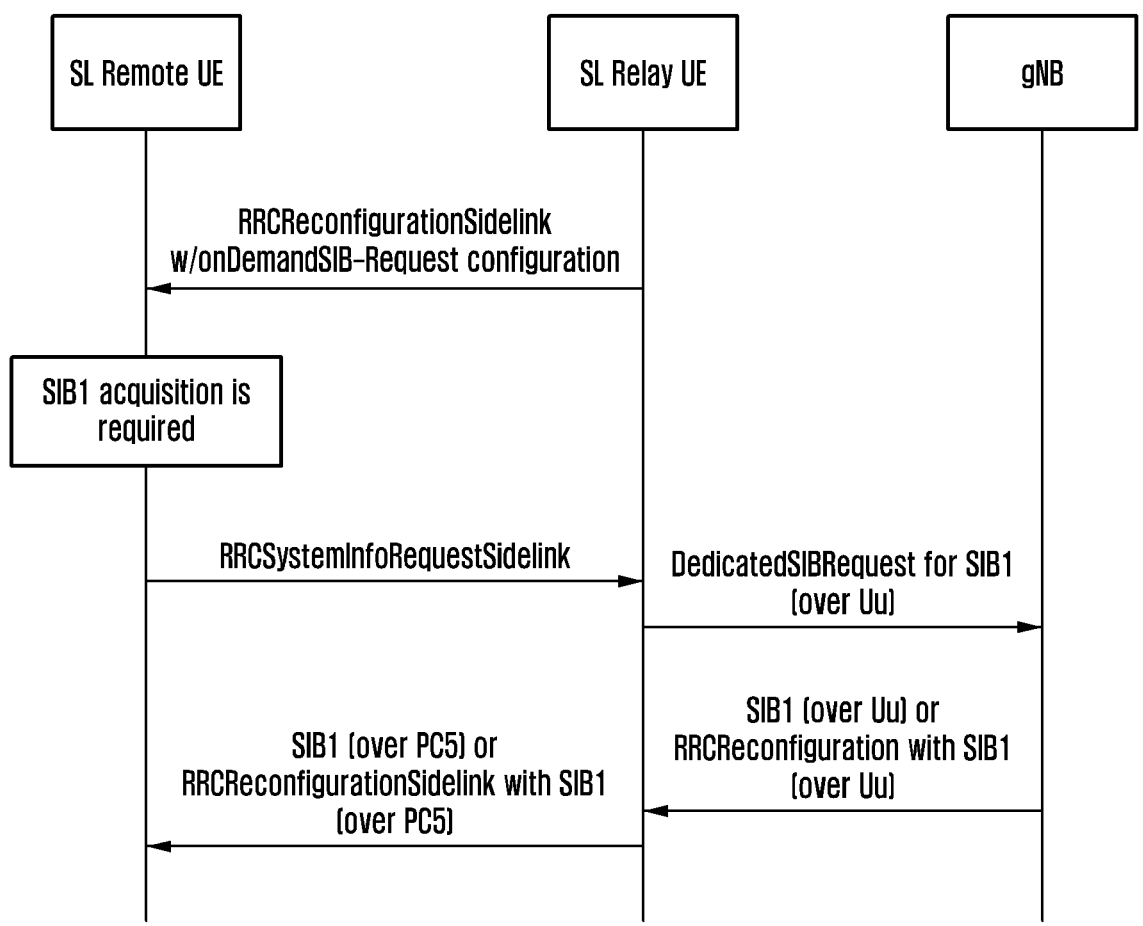

FIGS. 9A and 9B are diagrams illustrating an operation of a sidelink remote UE acquiring a system information message according to various embodiments of the disclosure.

Regarding SIB1 or MIB for remote UE, if remote UE needs SIB1 or MIB but the remote UE does not have stored valid SIB1 or MIB, then remote UE in RRC_CONNECTED can use on demand SIB request as in its RRC_IDLE or RRC_INACTIVE.

FIGS. 9A and 9B are operational embodiments of performing an operation of determining that at least one or a combination of the MIB or the SIB1 is required by the sidelink remote UE in an RRC connection mode and establishing a connection with the sidelink relay UE, and requesting and acquiring transmission of the MIB or the SIB1.

Referring to FIG. 9A, the sidelink remote UE may acquire configuration information required to transmit an on-demand SI request for MIB, SIB1, other SIB(s), or posSIB(s) through the sidelink connection from the connected sidelink relay UE. The procedure in which the sidelink remote UE transmits the on-demand SI request for the MIB or SIB1 to the sidelink relay UE in the sidelink connection may be applied to the case of the sidelink remote UE with the gNB in at least one of an RRC connection mode, an RRC idle mode, and an RRC inactive mode. The procedure in which the sidelink remote UE transmits the on-demand SI request for the other SIB(s) or posSIB(s) to the sidelink relay UE in the sidelink connection may be applied to the case of the sidelink remote UE with the gNB in at least one of an RRC idle mode and an RRC inactive mode. In a case where the sidelink remote UE requests the on demand SI request for other SIB(s) or posSIB(s) in the RRC connection mode with the gNB, the sidelink remote UE may perform the procedure of FIG. 6. The onDemandSIB-Request configuration may be acquired from an RRCReconfigurationSidelink message transmitted from the sidelink relay UE to the sidelink remote UE. The sidelink remote UE may acquire information of at least one or a combination of onDemandSIB-RequestSidelink and onDemandSIB-RequestProhibitTimerSidelink from the RRCReconfigurationSidelink message.

```
RRCReconfigurationSidelink-IEs ::=            SEQUENCE {
   onDemandSIB-RequestSidelink SetupRelease { OnDemandSIB-
RequestSidelink } OPTIONAL, -- Need M
}
onDemandSIB-RequestSidelink ::=               SEQUENCE {
   onDemandSIB-RequestProhibitTimerSidelink   ENUMERATED
{T1, T2, T3, T4, T5, T6, T7, T8}
}
 onDemandSIB-RequestSidelink
 If the field is present, the UE is allowed to request SIB(s) on-demand
 via PC5 RRC message while it is connected with relay UE.
 onDemandSIB-RequestProhibitTimerSidelink
 Prohibit timer for requesting SIB(s) on-demand via PC5 RRC message
 while remote UE is connected with relay UE. Value in seconds.
```

If the sidelink remote UE does not have a valid system information message for at least one or a combination of MIB, SIB1, other SIB(s) and posSIB(s) and it is determined that it is necessary to acquire a system information message, the sidelink remote UE may transmit the on-demand SI request message to the sidelink relay UE through the sidelink connection. The on-demand SI request message transmitted from the sidelink remote UE to the sidelink relay UE may correspond to, for example, an RRCSystemInfoRequestSidelink message. An example of the RRCSystemInfoRequestSidelink message is as follows.

The PC5 RRC message (e.g., RRCSystemInfoRequestSidelink) can be transferred as SCCH-Message over PC5. Regarding SIB1, if requested-SI-List IE can include on demand request for SIB1 then requested-SIB1 IE is not needed.

```
RRCSystemInfoRequestSidelink ::=       SEQUENCE {
   criticalExtensions                  CHOICE {
      rrcSystemInfoRequestSidelink
   RRCSystemInfoRequestSidelink-IEs,
      futureExtension
   }
}
RRCSystemInfoRequestSidelink-IEs ::=   SEQUENCE {
   requested-SI-List                   BIT STRING (SIZE
(maxSI-Message)),
   requested-PosSI-List                BIT STRING (SIZE (maxSI-
Message)),
   requested-SIB1                      ENUMERATED {true}
OPTIONAL,
   requested-MIB                       ENUMERATED {true}
                                       OPTIONAL,
   spare                               BIT STRING (SIZE (XX))
}
```

Upon receiving the RRCSystemInfoRequestSidelink message from the sidelink remote UE, the sidelink relay UE may transmit the system information to the sidelink remote UE if the sidelink remote UE has valid system information on at least one or a combination of MIB, SIB1, other SIB(s), and posSIB(s). The method for the sidelink relay UE to transmit the system information to the sidelink remote UE may be at least one or a combination of transmitting the corresponding system information (e.g., transmitting the SIB1) through the sidelink connection or transmitting the RRCReconfigurationSidelink message including the corresponding system information (e.g., transmitting RRCReconfigurationSidelink including the SIB1) through the sidelink connection. Here, the system information message transmitted from the sidelink relay UE to the sidelink remote UE may be transmitted through the SL-SRB through which the PC5-RRC message is transmitted, through the SL-SRB through which the sidelink PC5-S signaling is transmitted, or may be transmitted through a different sidelink signaling bearer. On the other hand, the gNB may broadcast MIB, SIB1, other SIB(s), and posSIB(s) through the Uu link or may transmit the RRCReconfiguration including the MIB, SIB1, other SIB(s), and posSIB(s) to the sidelink relay UE. The sidelink relay UE may acquire the MIB, SIB1, other SIB(s), and posSIB(s) transmitted from the gNB through the Uu link, or may acquire system information included in the RRCReconfiguration transmitted to the sidelink relay UE itself.

Referring to FIG. 9B, the sidelink remote UE may acquire configuration information required to transmit an on-demand SI request for MIB, SIB1, other SIB(s), or posSIB(s) through the sidelink connection from the connected sidelink relay UE. The onDemandSIB-Request configuration may be acquired from an RRCReconfigurationSidelink message transmitted from the sidelink relay UE to the sidelink remote UE. The sidelink remote UE may acquire information of at least one or a combination of onDemandSIB-RequestSidelink and onDemandSIB-RequestProhibitTimerSidelink from the RRCReconfigurationSidelink message.

```
RRCReconfigurationSidelink-IEs ::=            SEQUENCE {
   onDemandSIB-RequestSidelink SetupRelease { OnDemandSIB-
RequestSidelink } OPTIONAL, -- Need M
}
onDemandSIB-RequestSidelink ::=               SEQUENCE {
   onDemandSIB-RequestProhibitTimerSidelink   ENUMERATED
{T1, T2, T3, T4, T5, T6, T7, T8}
}
 onDemandSIB-RequestSidelink
 If the field is present, the UE is allowed to request SIB(s) on-demand
 via PC5 RRC message while it is connected with relay UE.
 onDemandSIB-RequestProhibitTimerSidelink
 Prohibit timer for requesting SIB(s) on-demand via PC5 RRC message
 while remote UE is connected with relay UE. Value in seconds.
```

If the sidelink remote UE does not have a valid system information message for at least one or a combination of MIB, SIB1, other SIB(s) and posSIB(s) and it is determined that it is necessary to acquire a system information message, the sidelink remote UE may transmit the on-demand SI request message to the sidelink relay UE through the sidelink connection. The on-demand SI request message transmitted from the sidelink remote UE to the sidelink relay UE may correspond to, for example, an RRCSystemInfoRequestSidelink message. An example of the RRCSystemInfoRequestSidelink message is as follows.

The PC5 RRC message (e.g., RRCSystemInfoRequestSidelink) can be transferred as SCCH-Message over PC5. Regarding SIB1, if requested-SI-List IE can include on demand request for SIB1 then requested-SIB1 IE is not needed.

```
RRCSystemInfoRequestSidelink ::=        SEQUENCE {
    criticalExtensions                  CHOICE {
        rrcSystemInfoRequestSidelink
RRCSystemInfoRequestSidelink-IEs,
        futureExtension
    }
}
RRCSystemInfoRequestSidelink-IEs ::=    SEQUENCE {
    requested-SI-List                   BIT STRING (SIZE
(maxSI-Message)),
    requested-PosSI-List                BIT STRING (SIZE (maxSI-
Message)),
    requested-SIB1                      ENUMERATED {true}
OPTIONAL,
    requested-MIB                       ENUMERATED {true}
                                        OPTIONAL,
    spare                               BIT STRING (SIZE (XX))
}
```

Upon receiving the RRCSystemInfoRequestSidelink message from the sidelink remote UE, the sidelink relay UE may transmit the DedicatedSIBRequest corresponding to the on-demand SI request to the gNB if it is determined that the sidelink remote UE has not valid system information on at least one or a combination of MIB, SIB1, other SIB(s), and posSIB(s). The DedicatedSIBRequest may include necessary system information, for example, the SIB1. Upon receiving the on-demand SI request from the sidelink relay UE, the gNB may transmit the requested system information, for example, the SIB1, to the sidelink relay UE through the Uu connection. The gNB may broadcast MIB, SIB1, other SIB(s), and posSIB(s) through the Uu link or transmit a system information message necessary for the sidelink relay UE by including the MIB, SIB1, other SIB(s), and posSIB(s) in RRCReconfiguration transmitted to the sidelink relay UE. The sidelink relay UE may acquire the MIB, SIB1, other SIB(s), and posSIB(s) transmitted from the gNB through the Uu link, or may acquire system information included in the RRCReconfiguration transmitted to the sidelink relay UE itself.

The sidelink relay UE may transmit the system information requested by the sidelink remote UE through the sidelink. The method for the sidelink relay UE to transmit the system information to the sidelink remote UE may be at least one or a combination of transmitting the corresponding system information (e.g., transmitting the SIB1) through the sidelink connection or transmitting the RRCReconfigurationSidelink message including the corresponding system information (e.g., transmitting RRCReconfigurationSidelink including the SIB1) through the sidelink connection. Here, the system information message transmitted from the sidelink relay UE to the sidelink remote UE may be transmitted through the SL-SRB through which the sidelink RRC message is transmitted, through the SL-SRB through which the sidelink PC5-S signaling is transmitted, or may be transmitted through a different sidelink signaling bearer.

Operations of FIGS. 9A and 9B may be used to request valid system information that the sidelink remote UE needs to acquire through the sidelink relay UE connected to the sidelink remote UE when the sidelink remote UE is in the RRC inactive mode or the RRC idle mode. For RRC Idle/INACTIVE remote UE, remote UE informs relay UE about requested SIB type(s) via PC5 RRC message. Then, relay UE triggers legacy on-demand SI acquisition procedure according to its own RRC state (if needed) and sends the acquired SIB to remote UE.

---

If the remote UE is in RRC_CONNECTED and the remote UE has not stored a valid version of SIB1:
-     for the SIB1:
  - ■ if onDemandSIB-RequestSidelink is configured and timer TYYY is not running:
    - ♦ initiate transmission of the RRCSystemInfoRequestSidelink message;
    - ♦ start timer TYYY with the timer value set to the onDemandSIB-RequestProhibitTimerSidelink;
-     Note that UE does not check for Common Search Space.

Remote UE receives requested SIB1 from relay UE over PC5.

If the remote UE is in RRC_INACTIVE or the remote UE is in RRC_IDLE and the remote UE has not stored a valid version of a SIB or posSIB, of one or several required SIB(s) or posSIB(s)::
-     for the SIB(s) or posSIB(s):
  - ■ if onDemandSIB-RequestSidelink is configured and timer TYYY is not running:
    - ♦ initiate transmission of the RRCSystemInfoRequestSidelink message;
    - ♦ start timer TYYY with the timer value set to the onDemandSIB-RequestProhibitTimerSidelink;

Remote UE receives requested SIB(s) or posSIB(s) from relay UE over PC5

---

Actions related to transmission of RRCSystemInfoRequestSidelink message

The UE shall set the contents of RRCSystemInfoRequestSidelink message as follows:

1> if the procedure is triggered to request the required SI message(s) other than positioning:

2> set the requested-SI-List to indicate the SI message(s) that the UE requires to operate within the cell;

-continued

```
1>  if the procedure is triggered to request the required SI message(s) for positioning:
    2>  set the requested-PosSI-List to indicate the SI message(s) that the UE upper layers
        require for positioning operations;
1>  if the procedure is triggered to request the SIB1:
    2>  set the requested-SIB1;
1>  if the procedure is triggered to request the MIB:
    2>  set the requested-MIB;
The UE shall submit the RRCSystemInfoRequestSidelink message to lower layers for
transmission.
```

The table below describes the operation of the sidelink remote UE acquiring and processing the MIB when it is determined that the sidelink remote UE may acquire the MIB, for example, in a case where the sidelink remote UE is within the coverage of the gNB, the MIB may be acquired from the gNB, or the MIB may be acquired from the sidelink relay.

```
            5.2.2.3.1 Acquisition of MIB and SIB1
The UE shall:
1>  apply the specified BCCH configuration;
1>  if the UE is in RRC_IDLE or in RRC_INACTIVE; or
1>  if the UE is in RRC_CONNECTED while T311 is running:
    2>  acquire the MIB, which is scheduled as specified in
        TS 38.213;
    2>  if the UE is unable to acquire the MIB;
        3>  perform the actions as specified in clause 5.2.2.5;
    2>  else:
        3>  perform the actions specified in clause 5.2.2.4.1.
```

According to an embodiment of the disclosure, in a case where the sidelink remote UE is connected to the sidelink relay UE, that is, when the PC5 direct connection is maintained with the sidelink relay UE, the side link remote UE may not obtain the MIB message transmitted from the gNB when the sidelink remote UE is in RRC idle mode or RRC inactive mode for the gNB. For example, although the sidelink remote UE is out of coverage of the gNB, the sidelink remote UE may maintain the RRC idle mode or the RRC inactive mode in which the sidelink remote UE may acquire a downlink signal transmitted from the gNB through the PC5 direct connection with the sidelink relay UE. In this case, the sidelink remote UE may not perform the operation of acquiring or processing the MIB message of the gNB. When it is determined that the sidelink remote UE connected to the sidelink relay UE is not within the gNB coverage but is in the RRC idle mode or RRC inactive mode, the sidelink remote UE may perform at least one or a combination of the following operations.

```
            5.2.2.5   Essential system information missing
The UE shall:
1>  if in RRC_IDLE or in RRC_INACTIVE or in RRC_CONNECTED while
    T311 is running:
    2>      if the UE is unable to acquire the MIB:
            3>  consider the cell as barred in accordance with TS 38.304;
            3>  perform barring as if intraFreqReselection is set to allowed;
    2>      else if the UE is unable to acquire the SIB1:
            3>  consider the cell as barred in accordance with TS 38.304;
            3>  if the UE is a RedCap UE:
                4>  perform barring as if intraFreqReselectionRedCap is
                    set to allowed;
            3>  else:
                4>  perform cell re-selection to other cells on the same
                    frequency as the barred cell as specified in TS 38.304.
```

```
            5.2.2.4.1  Actions upon reception of the MIB
Upon receiving the MIB the UE shall:
1>  store the acquired MIB;
1>  if the UE is in RRC_IDLE or in RRC_INACTIVE, or if the
    UE is in RRC_CONNECTED while T311 is running:
    2>      if the cellBarred in the acquired MIB is set to barred:
            3>  if the UE is a RedCap UE:
                4> if ssb-SubcarrierOffset indicates SIB1 is
                transmitted in the cell (TS 38.213)
                    5>      acquire the SIB1, which is scheduled as
                            specified in TS 38.213;
            3>  consider the cell as barred in accordance with TS 38.304;
            3>  perform cell re-selection to other cells on the same
                frequency as the barred cell as specified in TS 38.304;
    2>      else:
            3>  apply the received systemFrameNumber, pdcch-ConfigSIB1,
                subCarrierSpacingCommon, ssb-SubcarrierOffset and
                dmrs-TypeA-Position.
```

(A-1) The sidelink remote UE may not apply the specified broadcast control channel (BCCH) configuration for acquiring the MIB.

(A-2) Alternatively, the sidelink remote UE may apply the specified BCCH configuration for acquiring the MIB.

(B) The sidelink remote UE may not acquire the MIB of the gNB. (It may not be acquired directly from the gNB or may not be acquired through relay transmission of the sidelink relay UE)

(C) When it is determined that the sidelink remote UE has not acquired the MIB, the sidelink remote UE may not perform the operation of the UE that has not acquired the MIB in section 5.2.2.5.

(D) When it is determined that the sidelink remote UE has acquired the MIB, the operation of 5.2.2.4.1 may not be performed.

According to an embodiment of the disclosure, in a case where the sidelink remote UE connected to the sidelink relay determines that the information of at least one or a combination of MIB, SIB1, other SIB(s), and posSIB(s) stored in the sidelink remote UE in the RRC idle mode or RRC inactive mode is invalid or determines that the information of at least one or a combination of MIB, SIB1, other SIB(s), and posSIB(s) is required, and performs a procedure for requesting at least one or a combination of MIB, SIB1, other SIB(s), and posSIB(s) through the sidelink relay, the sidelink remote UE connected to the sidelink relay may not perform the random access procedure (RACH procedure) to the gNB as a procedure for requesting system information of at least one or a combination of MIB, SIB1, other SIB(s), posSIB(s), which is determined to be invalid or system information of at least one or a combination of MIB, SIB1, other SIB(s), posSIB(s), which is determined to be required. Here, an operation of requesting system information determined to be invalid or system information determined to be required through the random access procedure (RACH procedure) with the gNB may be generally performed by the UE in the RRC idle mode or RRC inactive mode.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a remote user equipment (UE) in a communication system, the method comprising:
in case that the remote UE is in a radio resource control (RRC) idle or an RRC inactive:
identifying whether the remote UE has not stored a valid version of system information block (SIB)1;
in case that the remote UE has not stored the valid version of SIB1,
transmitting, to a relay UE, a first message related to request for an SIB1; and
receiving, from the relay UE, a second message including the requested SIB1.

2. The method of claim 1, further comprising:
in case that the remote UE is in an RRC connected:
identifying whether the remote UE has not stored a valid version of SIB other than the SIB1; and
in case that the remote UE has not stored the valid version of SIB,
transmitting, to a base station via the relay UE, a third message related to request for an SIB other than the SIB1,
wherein the third message is transmitted based on scheduling information in a stored SIB1.

3. The method of claim 1, further comprising:
in case that the remote UE is in the RRC idle or the RRC inactive, identifying whether the remote UE has not stored a valid version of SIB other than the SIB1,
wherein the first message is further related to request for an SIB other the SIB1 and the second message further includes the requested SIB in case that the remote UE has not stored the valid version of SIB.

4. The method of claim 1, wherein a master information block, (MIB) is not obtained by the remote UE in case that the remote UE is in the RRC idle or the RRC inactive.

5. The method of claim 1, further comprising receiving, from the relay UE, an SIB1 without a request to the relay UE.

6. A method performed by a relay user equipment (UE) in a communication system, the method comprising:
receiving, from a remote UE, a first message related to request for a system information block (SIB)1 for the remote UE in a radio resource control (RRC) idle or an RRC inactive;
identifying whether the relay UE has not stored a valid version of SIB1; and
transmitting, to the remote UE in the RRC idle or the RRC inactive, a second message including the requested SIB1 based on the identification.

7. The method of claim 6, wherein the first message is further related to request for an SIB other than the SIB1 and the second message further includes the requested SIB.

8. The method of claim 6, wherein the transmitting of the second message comprises:
in case that the relay UE has not stored the valid version of SIB1, receiving, from a base station, the requested SIB1, and transmitting, to the remote UE in the RRC idle or the RRC inactive, the second message including the requested SIB1 received from the base station.

9. A remote user equipment (UE) in a communication system, the remote UE comprising:
a transceiver; and
a processor coupled with the transceiver and configured to:
in case that the remote UE is in a radio resource control (RRC) idle or an RRC inactive;
identify whether the remote UE has not stored a valid version of system information block (SIB)1,
in case the that remote UE has not stored the valid version of SIB1;
transmit, to a relay UE, a first message related to request for an SIB1, and
receive, from the relay UE, a second message including the requested SIB1.

10. The remote UE of claim 9, wherein the processor is further configured to:
in case that the remote UE is in an RRC connected;
identify whether the remote UE has not stored a valid version of SIB other than the SIB1, and
in case that the remote UE has not stored the valid version of SIB;
transmit, to a base station via the relay UE, a third message related to request for an SIB other than the SIB1,
wherein the third message is transmitted based on scheduling information in a stored SIB1.

11. The remote UE of claim 9, wherein the processor is further configured to:
in case that the remote UE is in the RRC idle or the RRC inactive, identify whether the remote UE has not stored a valid version of SIB other than the SIB1,
wherein the first message is further related to request for an SIB other than the SIB1 and the second message further includes the requested SIB in case that the remote UE has not stored the valid version of SIB.

12. The remote UE of claim 9, wherein a master information block, (MIB) is not obtained by the remote UE in case that the remote UE is in the RRC idle or the RRC inactive.

13. The remote UE of claim 9, wherein the processor is further configured to receive, from the relay UE, an SIB1 without a request of the relay UE.

14. A relay user equipment (UE) in a communication system, the relay UE comprising:
a transceiver; and
a processor coupled with the transceiver and configured to:
receive, from a remote UE, a first message related to request for a system information block (SIB)1 for the remote UE in a radio resource control (RRC) idle or an RRC inactive,
identify whether the relay UE has not stored a valid version of SIB1, and
transmit, to the remote UE in the RRC idle or the RRC inactive, a second message including the requested SIB1 based on the identification.

15. The relay UE of claim 14, wherein the first message is further related to request for an SIB other than the SIB1 and the second message further includes the requested SIB.

16. The method of claim 6, wherein the transmitting of the second message comprises:
in case that the relay UE has stored the valid version of SIB1, transmitting, to the remote UE in the RRC idle or the RRC inactive, the second message including the stored valid version of SIB1 for the requested SIB1.

17. The relay UE claim 14, wherein, for the transmitting of the second message, the processor is further configured to:
in case that the relay UE has not stored the valid version of SIB1:
receive, from a base station, the requested SIB1, and
transmit, to the remote UE in the RRC idle or the RRC inactive, the second message including the requested SIB1 received from the base station.

18. The relay UE claim 14, wherein, for the transmitting of the second message, the processor is further configured to:
in case that the relay UE has stored the valid version of SIB1, transmit, to the remote UE in the RRC idle or the RRC inactive, the second message including the stored valid version of SIB1 for the requested SIB1.

* * * * *